(12) United States Patent
Le et al.

(10) Patent No.: US 9,369,451 B2
(45) Date of Patent: Jun. 14, 2016

(54) SYSTEMS, METHODS, AND APPARATUSES FOR SHARING RIGHTS

(71) Applicant: DiCentral Corporation, Houston, TX (US)

(72) Inventors: Huan Le, Houston, TX (US); Khanh Tuan Phi, Sugar Land, TX (US)

(73) Assignee: DiCentral Corporation, Houston, TX (US)

( * ) Notice: Subject to any disclaimer, the term of this patent is extended or adjusted under 35 U.S.C. 154(b) by 0 days.

(21) Appl. No.: 14/181,389

(22) Filed: Feb. 14, 2014

(65) Prior Publication Data

US 2014/0230034 A1      Aug. 14, 2014

Related U.S. Application Data

(60) Provisional application No. 61/764,822, filed on Feb. 14, 2013.

(51) Int. Cl.
*H04L 29/06* (2006.01)
*G06F 21/10* (2013.01)

(52) U.S. Cl.
CPC .............. *H04L 63/08* (2013.01); *G06F 21/10* (2013.01); *G06F 21/105* (2013.01); *H04L 63/10* (2013.01); *G06F 2221/2141* (2013.01)

(58) Field of Classification Search
CPC .......... G06F 17/30244; G06F 21/6218; G06F 21/10; G06F 15/16; G06F 17/30; G06F 7/04; G06K 9/00677; G06K 9/00288; G06K 9/00; H04L 9/32; H04L 63/10; H04L 9/00; H03M 1/68; H04K 1/00; H04N 7/16
USPC ............ 726/1–7, 27–29; 709/219, 229; 382/305; 713/187
See application file for complete search history.

(56) References Cited

U.S. PATENT DOCUMENTS

| | | | | |
|---|---|---|---|---|
| 7,856,657 | B2 * | 12/2010 | Moore et al. | 726/5 |
| 8,413,219 | B2 * | 4/2013 | Downey et al. | 726/4 |
| 8,646,049 | B2 * | 2/2014 | Goeller et al. | 726/4 |
| 8,955,149 | B1 * | 2/2015 | Baer | G06F 17/30 709/229 |

* cited by examiner

*Primary Examiner* — Thanhnga B Truong
(74) *Attorney, Agent, or Firm* — Chowdhury Law Group, P.C.

(57) ABSTRACT

A method of sharing rights includes, using one or more processors, at the request of a first user, granting a right of the first user to a second user, contingent upon consent of the second user. Rights may be shared between any two parties on an individual basis. Corresponding systems, apparatuses and articles of manufacture are provided. Such methods, systems, apparatuses and articles of manufacture may be implemented using a client-server arrangement.

21 Claims, 12 Drawing Sheets

SYSTEMS, METHODS, AND APPARATUSES FOR SHARING RIGHTS

CROSS-REFERENCE TO RELATED APPLICATIONS

This application claims priority under 35 USC §119(e)(1) of Provisional Application No. 61/764,822, filed Feb. 14, 2013, incorporated herein by reference.

STATEMENT REGARDING FEDERALLY SPONSORED RESEARCH

Not applicable.

TECHNICAL FIELD OF THE DISCLOSURE

The present disclosure relates generally to methods, systems, apparatuses and articles of manufacture for sharing rights. More particularly, the disclosure relates to methods, systems, apparatuses and articles of manufacture for sharing rights via a social network using a server and clients, where rights may be shared between any two parties on an individual basis.

BACKGROUND

Traditional social media permit individuals to establish social relationships with one another in only rigid, delimited ways. Typically, such a relationship is established by a user assigning another user to a category or group, e.g., "friends," "family," or "acquaintances." The terms of the relationship between any two users are defined by the category or group. For example, all users assigned by a given user to the category of "friends" may be permitted access to a certain set of information of the given user, while all users assigned by the given user to the category of "family" may be permitted to access a different set of information of the given user. It is generally not possible to establish an individualized relationship, i.e., a relationship with a user based on that individual user; rather, it is only possible to establish relationships based on the group or category to which the individual user is assigned. For example, a given user cannot establish a relationship with individual A permitting individual A to access set A of information, a relationship with individual B permitting individual B to access set B of information, and so on. Also, it is generally not possible to establish any relationships other than the relationships that are pre-defined according to the pre-defined categories of the particular social medium (e.g., Facebook®); in other words, it is not possible to establish customized relationships. For example, a given user cannot select which information to share with his or her "friends"; rather, the particular social medium dictates that all of the given user's friends have access to a pre-defined, specified set of information of the given user.

In addition, traditional social media permit and facilitate relationships generally for the purpose of personal social interaction, e.g., for the purpose of recreation or entertainment, professional networking, etc. These media typically do not provide resources for establishing relationships for the purpose of facilitating practical utility, e.g., increasing efficiency in the workplace and/or in the economy at large. One reason for this is that traditional social media generally permit and facilitate the sharing of rights to access limited types of information, but not other types of rights, e.g., rights to perform other kinds of actions.

SUMMARY

Embodiments of the present invention provide systems, methods, apparatuses, and articles of manufacture for sharing rights, which address the above-discussed limitations in the prior art.

According to a first aspect of the invention, there is provided a method of sharing rights, the method including, using one or more processors, at the request of a first user, granting a right of the first user to a second user, contingent upon consent of the second user.

According to a second aspect of the invention, there is provided an article of manufacture including a non-transitory machine-readable medium containing instructions that, when executed, enable a processor-based system to: at the request of a first user, grant a right of the first user to a second user, contingent upon consent of the second user.

According to a third aspect of the invention, there is provided a system for sharing rights, the system including a server, the server including one or more processors and memory coupled to the one or more processors. The memory contains executable instructions that, when executed, enable the one or more processors, in communication with one or more client devices, to: at the request of a first user, grant a right of the first user to a second user, contingent upon consent of the second user.

Other embodiments are described and claimed.

BRIEF DESCRIPTION OF THE DRAWINGS

The following figures form part of the present specification, are included to further demonstrate certain aspects of the present claimed subject matter, and should not be used to limit or define the present claimed subject matter. The claimed subject matter may be better understood by reference to one or more of these drawings in combination with the description of embodiments presented herein. Consequently, a more complete understanding of the present embodiments, including features and advantages thereof, may be acquired by referring to the following description taken in conjunction with the accompanying drawings, in which like reference numerals may identify like elements, wherein:

NOTATION AND NOMENCLATURE

Figure 1A:
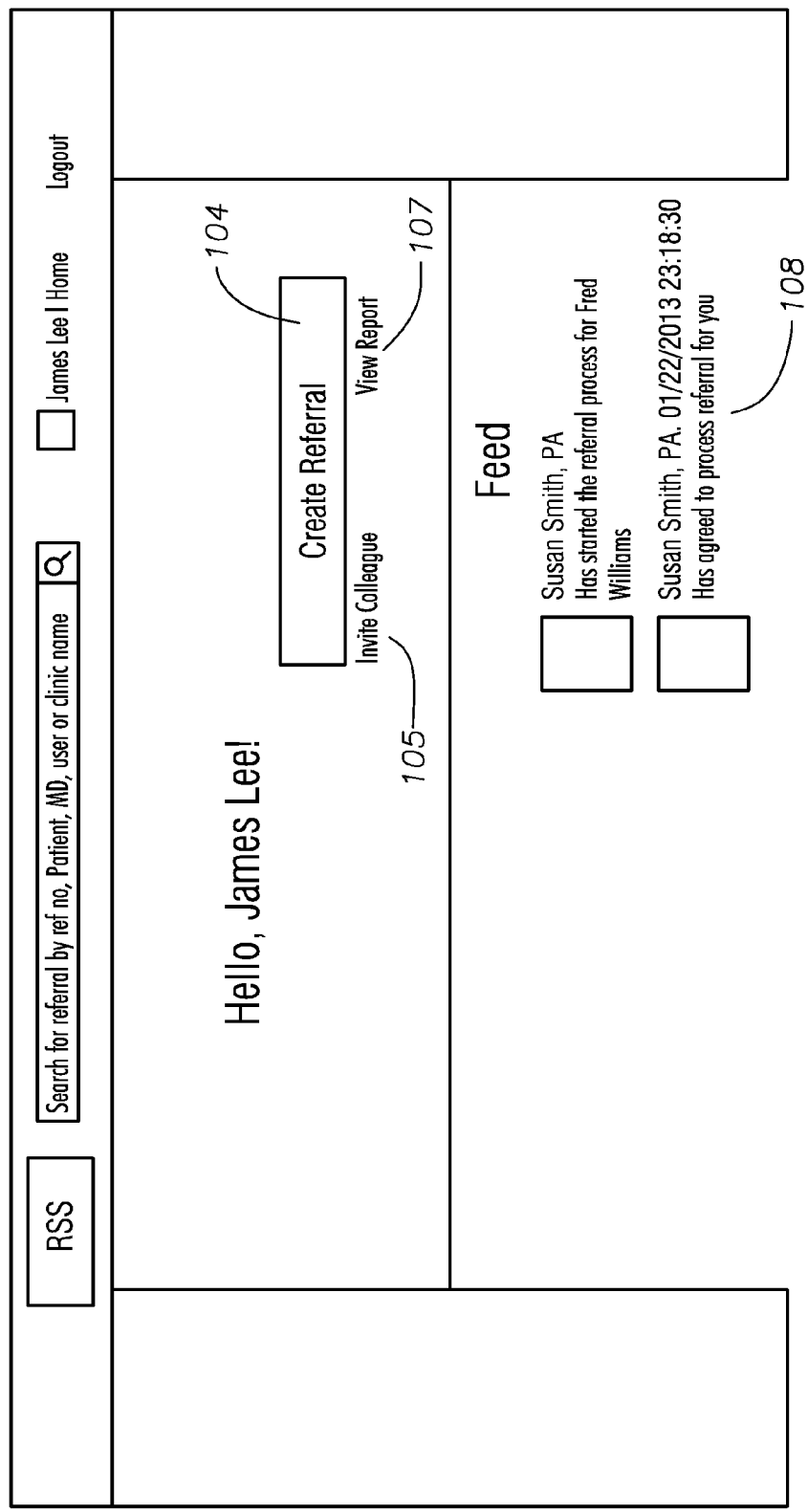
FIGS. 1A-1E illustrate screenshots showing selected operations of a system for sharing rights in accordance with at least some embodiments.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ."

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Embodiments of the present invention provide systems, methods, apparatuses, and articles of manufacture, implemented using, e.g., computerized devices and communication networks, for establishing customizable, individualized functional relationships between users of a social medium. By "functional" is meant that a relationship facilitates practical utility. Such a functional relationship may be defined by the right(s) shared between the so-related users (or the right(s) granted by one user to another user). These rights may include, among others, rights to access information and rights to perform other kinds of actions. Such a right may require, legally or pursuant to other (e.g., professional, ethical, etc.) rules or norms, or on other grounds, authorization given by another, authorizing performance of the specific action, possibly under certain specified conditions. The sharing of a right may constitute the granting of such authorization by the other. In some cases, the right may be a right of one party to the functional relationship to perform an action on behalf of another party to the relationship, e.g., in the manner of or similar to an action performed by an agent on behalf of a principal.

In short, in the context of the instant disclosure, a right is a right to perform an action (in many cases, the action is an action requiring authorization). The term "action" is to be understood in a broad sense corresponding to grammatical actions rather than merely physical or bodily actions; thus, a right to access information is deemed to be a right to perform an action, viz., accessing information. Such rights may be shared among different parties (users), that is, a right may be granted by one party to another party (and a granted right may be revoked, or unshared, as discussed below). Accordingly, systems, methods, apparatuses, and articles of manufacture described herein may be referred to as rights sharing systems, methods, apparatuses, and articles of manufacture.

It should also be noted that, while for convenience the discussion herein may frequently refer to individuals or users as sharing rights and revoking shared rights, the instant disclosure is of course not limited to individuals or individual users, but is applicable to any kind of parties, e.g., groups of individuals, legal persons (e.g., corporations, etc.), other entities, or groups of the foregoing. Accordingly, statements using the terms "user" or "individual" should be understood as permitting of extrapolation to other kinds of parties, in such broad fashion.

Further, the above-mentioned systems, methods, apparatuses, and articles of manufacture may control not only the sharing of rights but also the exercise of rights, e.g., the performance of actions requiring authorization, by putatively authorized users. For example, such a system may be designed such that: any sharing of a right is necessarily executed via the system; the transaction (i.e., the sharing of the right) is recorded by the system; and the exercise of any shared right is contingent upon authorization by the system, the authorization being given if the system determines based on its records of transactions that the user requesting to exercise the shared right is authorized to exercise the shared right, i.e., has been granted the right by the user on behalf of whom s/he requests to act. In this regard, not only may users seek authorization to exercise a shared right, but the system may be designed such that third parties may seek confirmation from the system as to whether a user is authorized to exercise a (putatively shared) right.

The system may also be designed to require authentication (or authorization) of every user prior to permitting the user (i) to share a right, and/or (ii) to receive a shared right. Such authentication (or authorization) could be for the purpose of verifying the identity of the user, the purpose of verifying the credentials of the user, or for another purpose.

With regard to performing transactions (the sharing of rights), the system may (i) receive, from a granting user, a notification of a request to grant (i.e., share) a right by the granting user to a recipient user, (ii) transmit, to the recipient user, a notification of the request by the granting user to grant the right to the recipient user, (iii) permit the recipient user to reply to (accept or decline (refuse)) the request to grant the right, (iv) receive the reply (acceptance or refusal of the request to grant the right) from the recipient user, and (v) transmit a notification of the reply to the granting user. If the recipient user accepts the request to grant the right, the system deems the right granted to the recipient user and associates the right with the recipient user. If the recipient user declines the request to grant the right, the system deems the right not granted to the recipient user and does not associate the right with the recipient user. The system may also transmit to the granting user notification of the granting or non-granting of the right, as the case may be. This notification may be deemed equivalent to, and hence tantamount to, the notification of the reply (acceptance or refusal) to the granting user.

It is noted that the term "accept" (and grammatical variants thereof) are used interchangeably herein with the term "consent to" (and grammatical variants thereof); likewise, the opposing terms "decline," "refuse," and "does not consent to" (and grammatical variants thereof) are used interchangeably herein. Also, the terminology "share a right with" and "grant a right to" (and grammatical variants thereof) are used interchangeably herein, and the opposing terms "unshare a right" and "revoke a right" (and grammatical variants thereof) are used interchangeably herein.

It is further noted that the term "grantor" refers to a party who has successfully granted a right, and the term "grantee" refers to a party who has successfully been granted a right. In contrast, the term "granting user" refers to a party who requests to grant a right, and the result of the request may be a successful grant of the right or an unsuccessful grant of the right. Similarly, the terms "receiving user" or "recipient user" (the two terms are used interchangeably) refer to a party to whom a granting user requests to grant a right, and the result of the request may be a successful grant of the right (the receiving user accepts the grant) or an unsuccessful grant of the right (the receiving user declines the grant).

It should be noted that the system may be designed so that not only may rights be granted (shared), but also granted rights may be revoked (unshared). Moreover, both the grantor and the grantee may be provided with the ability to revoke a right granted by the grantor to the grantee. Although in the real world revocation by the grantee is not usually contemplated, in the context of the instant disclosure the grantee may revoke (give up, give back to the grantor) the granted right. Possible reasons the grantee may revoke a right may be, for example, that the grantee no longer wishes to have the granted right, the grantee is no longer able to perform the action defined by the right, etc. Accordingly, revocations of granted rights may also be deemed "transactions." The system may perform revocations, e.g., by (i) receiving, from a grantor or a grantee, a notification of a revocation of a granted right, (ii) transmitting, to the grantee or the grantor, respectively, the notification of the revocation, and (iii) deeming the granted right revoked (i.e., no longer granted) and dissociating the now-revoked right from the grantee.

With regard to the recording of the transactions, the system may record and store records of the transactions in one or more databases. Data defining each transaction may be recorded. For example, where the transaction is a request to grant a right, the following data may be recorded: the granting user, the receiving user, the right subject to grant, the reply of the receiving user (acceptance or refusal), and the status of the right (granted or not granted); where the transaction is a revocation of a right, the following data may be recorded: the grantor, the grantee, the right revoked, and the revoking party. In addition, other data pertaining to a transaction may be recorded, e.g., the date and time of the transaction, and other information. Of course, the above data may additionally or alternately be recorded in other formats or orderings. For example, while the above description of the recorded data may be understood as being from the 'point of view' of the transaction, the recorded data may also be set down from the 'point of view' of the result of the transaction, viz., the granted, refused or revoked right. For example, the recorded data may include: the granted rights, each granted right being defined by the right granted, the granting user, and the receiving user; the refusals of requests to grant rights, each refusal being defined by the right refused, the granting user, and the receiving (refusing) user; and the revoked rights, each revoked right being defined by the right revoked, the grantor, the grantee, and the revoking party. Of course, the system may record less or more data than described above.

The system may be designed such that, prior to accepting a user's request to share (grant) a right with (to) another, the right in question must have been associated with the granting user by the system. That is, where a user requests to share a right not associated with the user, the system would not permit the user to request to share the right. In this situation, the system may permit the user (subject to the constraints discussed below) to associate the right with him/herself at this time, in order for the user to proceed with the request to share the right.

It will be noted that a right may be either pre-defined by the system or created (formulated) by a user. The ability of a user to create or formulate his or her own rights is what is meant by saying, as above, that the system permits customizable functional relationships. Of course, the system need not be designed such as to admit of both of these types of rights, but could be limited to one of them.

With respect to rights pre-defined by the system, the system may be designed such that, for all users or for any group of users, the system automatically associates all such pre-defined rights of the respective user with the respective user. (As will be discussed below, the system may perform this automatic association based on comparing the criteria of the user with the various sets of criteria for the respective rights, both of which may have been inputted into and stored in the system.) As an alternative to this automatic associating performed by the system, the system may be designed in such a way that the user is permitted to select pre-defined rights as belonging to him/her, e.g., from a menu of pre-defined rights. As compared to this user selection of pre-defined rights, the automatic associating, performed by the system, of pre-defined rights with the user may be simpler and more convenient for the user.

With respect to user-created/formulated rights, the system may be designed so that, after creating/formulating a right, the user may (subject to the constraints discussed below) associate the right with him/herself.

With respect to both pre-defined rights and user-created/formulated rights, the system may be designed so that users are permitted to have only rights to which they are entitled under the law or pertinent rules, norms, etc. This may be accomplished, e.g., using a database of rights, where each right is associated with criteria that a user must satisfy in order to have the right, and a database of users, where each user is associated with the criteria that s/he satisfies. Assignment of a right to a user (whether the right is a pre-defined right associated with a user automatically by the system, the right is a pre-defined right selected by a user, the right is created/formulated by a user, or the right is granted to a user by another user) would be permitted only if the user satisfies the criteria for that particular right. The determination of which criteria must be satisfied in order for a given right to be assigned to a user may be made on the basis of the pertinent laws, rules, etc. Such determinations may be made prior to, or independently of, actual operation of the system. The determined criteria may be inputted into the system prior to, or independently of, actual operation of the system, and may be stored in association with the corresponding rights. The determination of which criteria a given user satisfies may be made on the basis of the above-mentioned authentication/authorization process (e.g., verification of credentials). It is also possible to make such determinations prior to, or independently of, actual operation of the system, e.g., where the users' respective criteria or credentials are provided to the system in advance of the user's use of the system. In view of the above discussion, it will be understood that assignment of rights to a user in the context of the system does not actually endow the user with rights in the real world (e.g., under pertinent laws, rules, etc.) but rather merely gives the user rights within the system. The system may be designed such that the rights assigned to the user within the system do not exceed or conflict with the rights belonging to the user in the real world. For example, where in the real world, e.g., under the law, the right to write a prescription is limited to those credentialed as medical doctors, the system may prevent the assigning of the right to write a prescription to any party other than a credentialed medical doctor.

A right may be characterized as comprising, or defined by, multiple components: (i) the authorized action; (ii) the authorized objects of the action; (iii) the parties bound by the action; and (iv) the conditions imposed upon the right. Not every right will necessarily have all of these components. While the plural has been used for components (ii)-(iv) above, it is possible in any given case that only a single one of any of these components exists. For simplicity, it is assumed that a right is characterized by a single type of action, but of course it is possible for a right to be characterized by multiple different kinds of actions (i.e., A could grant B the right to perform actions X, Y and Z).

Another way of characterizing a right, having the same conceptual content (components) as described above, is as a function, in the mathematical sense of function. Thus, a right R may be thought of as: $R=f(A, O, P, C)$, where A represents the authorized action, O represents the authorized objects, P represents the bound parties, and C represents the conditions imposed upon the right. Alternately, where there are multiple different conditions, C could be replaced by $C_1, C_2$, and so on. The other variables could be similarly replaced, as warranted. (Again, as above, the use of the singular or plural in describing the variables contained in the above formula (function) is for the sake of convenience and not to be taken as limiting to the singular or plural.)

It will be understood that O (authorized objects) and P (bound parties) may be thought of as conditions, in a more general sense of "condition," such that a right would be characterized as comprising (i) the authorized action; and (ii) the conditions imposed upon the right, or $R=f(A, C_1, C_2, C_3)$, where $C_1$ represents the authorized objects, $C_2$ represents the bound parties, and $C_3$ represents the other conditions. However, in view of the fundamental nature of the authorized objects and the bound parties, it is deemed more intuitive to represent them as elements distinct from conditions in the narrower sense, which are generally of a less fundamental nature.

In order to better grasp the conceptual model of a right set forth above, let us apply this model to an example of an actual right. Consider, for example, the right (of a doctor) to refer patients. In this case, the authorized action is the referring of one or more patients. The authorized objects are the particular patients referral of whom is authorized by the right (discussed further below). The party bound is the doctor granting the right, assuming that, under the law and/or the rules of medical ethics, the doctor is ultimately responsible for the patient with respect to whom the doctor has granted the right of referral to another. Where multiple doctors granted their right of referral to one or more others, there would be multiple bound parties. The conditions could be any of a wide-ranging set of conditions. For example, in the case of this particular right, a condition could be that the referral must be a referral for the patient for diagnosis and treatment by a specialist doctor, not a referral for the patient to receive medical services (e.g., imaging). (Of course, this condition could have simply been incorporated in the definition of the authorized action instead of being formulated as a condition.) Another example of a condition, in this instance a condition not limited in applicability to this particular right, would be a condition that the right itself is not re-grantable (transferable), that is, that the party to whom the right is granted is not permitted to grant the right to another party. Another example of a general condition would be a condition that the right is time-limited, i.e., expires after a certain specified amount of time, or, relatedly, that the authorized action may be performed only a limited, specified number of times (in the manner that a patient may be granted a right to refill a medical prescription a limited, specified number of times).

While the above example is from the medical field, the instant disclosure is of course not so limited but is applicable to any field or context, to any kinds of rights to perform one or more actions. Other examples of rights are the rights to: process a referral of a medical patient, write a prescription, write a check, create a password, and so on. Thus, example fields or contexts include: medical (e.g., a general practice doctor may share the right to refer patients and the right to process those referrals with an administrator working with the doctor); corporate (e.g., a chief financial officer may share the right to write checks in the name of the business with another officer of the company); information technology (e.g., a third party computer administrator may share the right to create a password for a particular company's domain with an information technology administrator of that company); legal (e.g., a client may share its right to take legal action with an attorney); construction (a general contractor may share its right to apply for a license with a sub-contractor); and so on.

In some cases, a user wanting to grant a right may be permitted or required to specify the right, e.g., with respect to the authorized objects and/or conditions of the right. Consider, again, the right (of a doctor) to refer patients. As stated, in terms of the conceptual model of a right discussed above, the authorized objects of this right are the patients. If a doctor wishes to grant a right to refer patients, the doctor should specify for which of his/her patients the right to refer is to be granted. For example, the doctor may specify that s/he is granting the right to refer only a particular patient X; a particular group of patients, such as the doctor's patients associated with a particular one of the doctor's several clinics, office locations, or affiliated hospitals; or all of the doctor's patients. In the case of a right such as this, (1) the system may be designed so as to require the user granting the right to specify the right, i.e., in this case, to specify the particular patients. Alternatively, (2) the system may be designed so as to merely permit the user granting the right to specify the right, with the proviso that, if the user fails to specify the right, the system will implement a default specification of the right. As a further alternative, (3) the system may be designed so as to not even permit the user granting the right to specify the right; instead, the system could impose a default specification of the right at the outset. Different ones of these three modes of operation, and different types of default specifications, may be appropriate and may be employed in different contexts and in the case of different kinds of rights. It will be noted that such specifications of rights may at the most expand the scope of the right to its maximum; thus, they do not exceed or violate the scope of the right. Inasmuch as the system will have been designed to prevent the rights assigned, within the system, to any user, from exceeding or conflicting with the rights belonging to the respective user in the real world, such specifications of rights a fortiori will not exceed or conflict with the rights belonging to the respective user in the real world.

In the case of conditions, as against authorized objects, of a right, the system may implement a default whereby the right being granted is deemed unconditioned, unless the user specifies conditions. The system may provide the granting user with a menu of types of conditions, whereby the granting user can select a condition (e.g., a time limit) and, if applicable, specify the content or value of the condition (e.g., a particular amount of time), that is to be imposed on the right being granted. For different kinds of rights, different such menus (different sets of conditions) may be provided, as appropriate or applicable.

Of course, it is possible to implement the rights sharing systems, methods, apparatuses, and articles of manufacture disclosed herein using rights defined as comprising components in addition to or other than those described above (viz., actions, objects, parties bound, conditions), or even using rights defined in an altogether different way.

As mentioned above, despite the use of the term "user" and "individual," the instant disclosure is not so limited, but applies also to groups of individuals, legal persons, etc. Thus, for example, rights may be shared among any of such various kinds of parties. For example, a group of individuals could grant a right to an individual, or vice versa, a legal entity could grant a right to an individual or a group of individuals, or vice versa, etc.

The foregoing has been a general description of embodiments of the present invention. The following is a further description of embodiments of the present invention, which description is made with reference to the figures. In various embodiments, a rights sharing system may be accessed using a web browser that provides a graphical user interface (GUI) between a user and the system. By manipulating the GUI a user may provide inputs to the system. The system processes the inputs and displays outputs to multiple users via their own personalized GUIs. As described herein, by this interaction between users and the rights sharing system, users may share rights, unshare rights, accept requests to share rights, decline requests to share rights, associate and dissociate rights with themselves, and the like, according to various embodiments. (As for dissociation of rights, a user may be permitted to dissociate from him/herself a right that, in the manner described above, is associated with him/her.) The system may also provide other functionality not directly pertaining to rights sharing and such related functions as authorizing the exercise of rights. This other functionality may include, e.g., providing users with the ability to communicate with other users, to update their profiles, etc. As users share rights and perform other operations with other parties via the system, a social network of functional relationships is formed. The hardware, software and/or firmware of such a system are described below with reference to FIGS. 4A-4E.

FIGS. 1A-1E illustrate screenshots 100A-100E of selected operations of a simple, exemplary rights sharing system according to one or more embodiments disclosed herein. FIGS. 1A-1E illustrate an implementation of a rights sharing system in the medical context, and in particular focus on the rights of making and processing a referral.

FIG. 1A shows a screenshot 100A, of a greeting, introductory, or home page of the system, displayed on a GUI. The user's name is shown as James Lee. In this example, the user is a medical doctor (MD). In at least one embodiment, users may be automatically associated with certain pre-defined rights, in accordance with the professional category or role (e.g., MD, nurse, physician assistant (PA)) of the user. For example, all MD users may be automatically associated with a given set of specified rights, which may be referred to as MD rights. Likewise, all nurse users may be automatically associated with a different set of specified rights, which may be referred to as nurse rights; all PA users may be automatically associated with a different set of specified rights, which may be referred to as PA rights; and so on. However, these sets of pre-defined rights may be varied for different implementations, e.g., for different medical networks, hospitals, etc. That is to say, for example, the set of MD rights in the rights sharing system in operation at hospital X may be adjusted to include rights A, B, C, D and E, while the set of MD rights in the rights sharing system in operation at hospital Y may be adjusted to include rights A, B, E, F and G. As a general example, an exemplary set of MD rights may include the rights of: making referrals, processing referrals, writing prescriptions, admitting new patients, purchasing medical equipment, and the like.

In the exemplary system illustrated in FIGS. 1A-1E, for use in the medical context, one of the rights that may be shared is the right to make a referral. According to the screenshot of FIG. 1A, a user (here, Dr. Lee) who possesses this right (e.g., by the right's being automatically associated with him by the system, or by having been granted the right by another) can perform (or commence performance of) the action authorized by the right, viz., making a referral, by clicking the button 104 labeled "Create Referral." In this way, for example, the MD user Dr. Lee may refer a patient to a specialist MD.

Further, Dr. Lee may make a request to share the right of making a referral with another party by clicking on the "Invite Colleague" link 105 located just below the "Create Referral" button 104. Clicking on this link may take the user Dr. Lee to a subsequent screen, for completion of the operation of making a request to share the right. Such subsequent screen is illustrated in FIG. 1C, discussed below.

Screenshot 100A also shows a news feed 108, which lists (recent) events that have occurred in the system that involve or bear on the user Dr. Lee. Specifically, in this example, news feed 108 indicates (in the older news item, shown at the bottom in the news feed 108) that Susan Smith, Dr. Lee's PA, has accepted the right to process referrals on behalf of Dr. Lee. This indicates that, although not shown in FIGS. 1A-1E, Dr. Lee previously requested to grant the right to process referrals to Susan Smith, and Susan Smith accepted this request. The system has allowed this transaction (whereby Dr. Lee granted a right to Susan Smith) to occur without requiring in person or face-to-face contact between these two individuals; rather, each user was able to access the system to perform the necessary actions (e.g., making a request to grant a right, replying to the request), for example, using his or her own GUI on his her or her own client device. News feed 108 also indicates (in the more recent news item, shown at the top in the news feed 108) that Susan Smith has started to process the referral for Dr. Lee's patient Fred Williams, in other words, has started to perform an action the right to perform which was granted to her by Dr. Lee.

Because the action of creating a referral and the action of processing a referral are so closely related, the system may be designed such that clicking "Create Referral" button 104 may take the user to a subsequent screen in which either of these two actions may be performed, and the "Invite Colleague" link 105 may take the user to a subsequent screen in which the rights to either of these two actions may be shared. It would also be possible for the system to include the right to make a referral and the right to process a referral in a single combined right, which could be shared.

If a user wishes to share a right (e.g., the right to make a referral) with another party, or to perform an action involving another party (e.g., make a referral to a specialist MD), and the other party is not registered with the system, the system may invite the other party to register with the system. However, the other party need not be registered with the system in order to use the system. That is, an unregistered user may reply to (accept or refuse) a request to share a right and may accordingly be granted or not granted the right, as applicable, and an unregistered user may accept or refuse a referral. To be sure, the system may provide registered users with advantages such as greater flexibility or convenience in using the system. Accordingly, the word "user" as used in this disclosure is not to be taken as being limited to a registered user, but rather may encompass any user of the system, whether registered or not, as the system may be designed to permit both registered and unregistered users to perform all actions described herein and to in any other way participate fully in the system.

A party may be invited to register with the system by an existing user of the system, as noted, or by the system. In this regard, the system may generate referral codes, which appear on invitations to register. By using such a referral code, a party may register with the system, for example, using only a name and an email address.

Screenshot 100A also shows a "View Report" link 107 located just below the "Create Referral" button 104. Using this link, a user may access reports, which may provide information of events or data, bearing on the user, that is more comprehensive or otherwise different from the information shown in news feed 108. For example, a report may show the rights associated with (and hence grantable by) the user (or the rights associated with all users of the user's category, if the system provides the same rights to all users of the user's category), the rights granted to (and hence exercisable by) the user, the rights refused by the user, the rights revoked from the user, the rights revoked by the user, the actions performed by the user, the actions performed by parties to whom the user granted rights to perform those actions, the queries made by third parties as to the user's authorization to perform actions (discussed below with reference to steps 235-245 of FIG. 2A), the components/specifications of any of the indicated rights, and so on. Alternatively, a report accessed from this webpage (which webpage pertains to making and processing referrals) may show only such information pertaining to the rights/actions of making and processing a referral. A report may also show the user's credentials or the criteria satisfied by the user (as explained above), but these data may also be accessed via the user's profile, shown in FIG. 1B, discussed below.

Although not shown in FIG. 1A, the webpage shown therein may also include another button labeled "Select Action/Right" or the like. By pressing this button, the user may be taken to a subsequent screen where the user may select an action he wishes to perform or a right he wishes to share, other than the right to make a referral or the right to process a referral. The subsequent screen may show a list of all actions the user is authorized to perform and all rights the user possesses and hence may grant. The user may select (e.g., click on) an action, a right, or an action/right pair from the list, which may take the user to a subsequent screen analogous to that shown in FIG. 1A, but pertaining to an action and/or right different than those referenced in FIG. 1A. For example, a user may select the action/right pair of writing a prescription (that is, the action of writing a prescription and the right of writing a prescription), and this may take the user to a screen analogous to that of FIG. 1A but in which button 104 is labeled "Write Prescription" and the news feed 108 shows events pertaining to this action/right. From this screen the user could perform (or commence performing) the action of writing a prescription by clicking the "Write Prescription" button, or the operation of making a request to share the right of writing a prescription by clicking the "Invite Colleague" link, analogously to the description above of performing the action of making a referral and performing the operation of making a request to share the right of making a referral. This screen could also have a "View Report" link that could operate analogously to that of FIG. 1A.

As an alternative to the arrangement described above, the home page of FIG. 1A could present the above-described list of all actions and rights, rather than being limited to a single action/right of "Create Referral" (as indicated above, the term "Create Referral" may refer to both making and processing a referral). In this case, the user could select and perform actions, and select and make requests to grant rights, from this home page, in a manner as described above or otherwise.

Figure 1B:
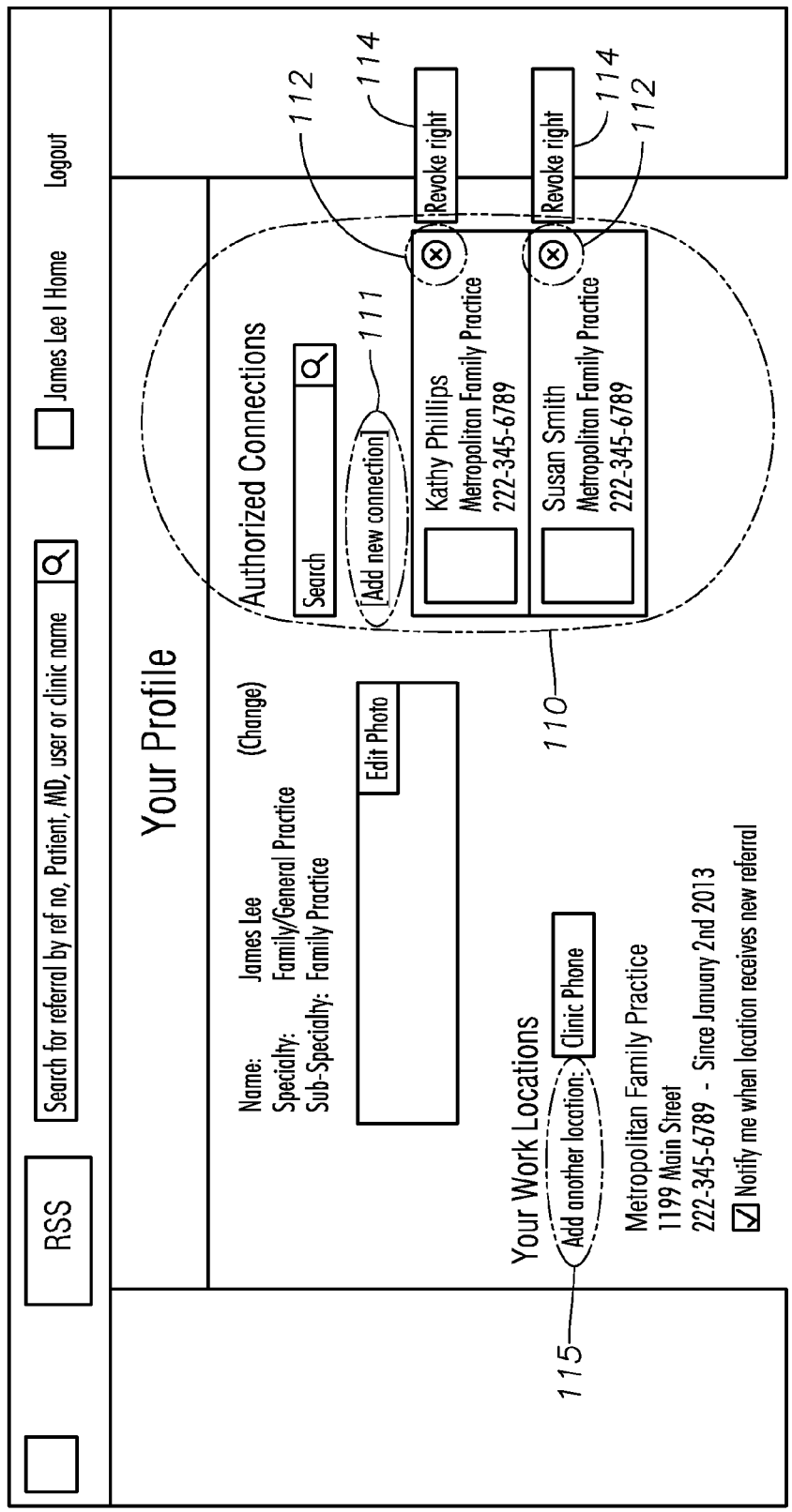
Figure 1C:
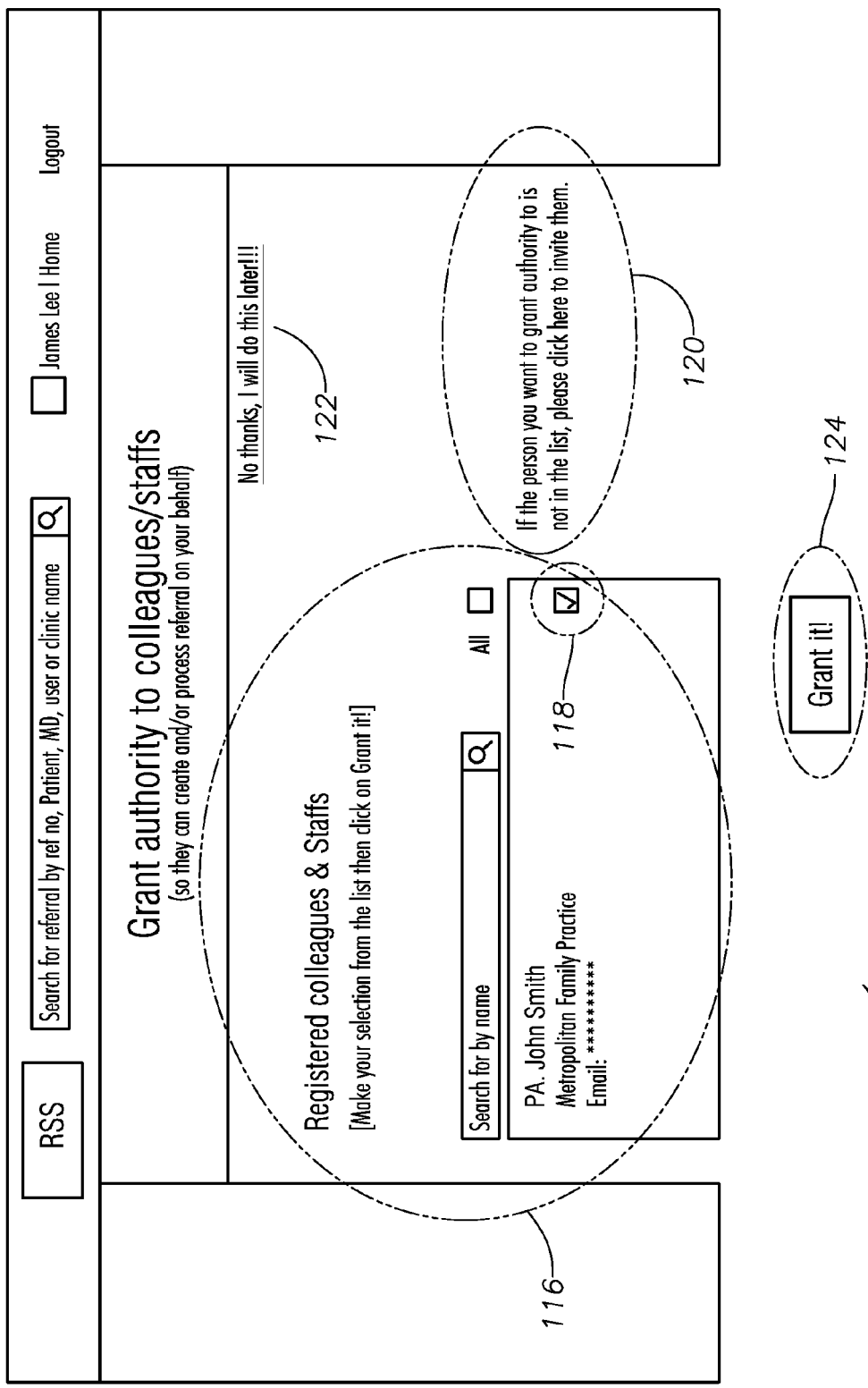

FIG. 1B shows a screenshot 100B, of a profile page of the system, displayed on a GUI, for the same user, Dr. Lee. Screenshot 100B shows a list of "Authorized Connections" 110, circled, which lists the parties to whom Dr. Lee has granted rights. In this example, Dr. Lee has granted rights to Kathy Phillips and Susan Smith. Next to each authorized connection (each user to whom Dr. Lee has granted rights) a button labeled "X" 112, circled, is shown. By clicking the "X" button 112 adjacent the name of a given authorized connection, a user revokes the right shared with the authorized connection, as indicated by the hover text 114 ("Revoke right") that appears adjacent the "X" button 112 when the user hovers over the "X" button 112 with a pointing device. Upon revocation of a right, the system may send a notification to the user whose right has been revoked, notifying the user of the revocation of the right.

Note that in the example shown in FIG. 1B, it is assumed that the sole right the system deals with is the combined right to create and process referrals. Accordingly, this is the right that is revoked by clicking on the "X" button 112. However, where the system deals with additional rights, the profile page may be designed differently. For example, the user may be permitted to click on (select) any of the authorized connections, which would take the user to a subsequent page showing the selected authorized connection with a list of all rights granted to the selected authorized connection by the user. An "X" button could be provided adjacent to each of these rights granted to the authorized connection by the user, whereby the user could revoke any right s/he previously granted to the authorized connection. The "X" button 112 on the profile page could be eliminated, or could be used for revoking all the rights granted to the authorized connection by the user. As another example, the profile page may show, instead of a list of authorized connections, a list of all rights associated with (hence grantable by) the user, or of all rights granted by the user. In this arrangement, the user could click on (select) any one of these rights, which would take the user to a subsequent page showing the selected right with a list of all authorized connections who have been granted that right by the user. An "X" button could be provided adjacent to each of these authorized connections, whereby the user could revoke the selected right from the adjacent authorized connection. The "X" button 112 on the profile page could be eliminated, or could be used for revoking the selected right from all the authorized connections of the user who have been granted that right.

Screenshot 100B also shows an "Add new connection" link 111, circled. By clicking on this link, a user may be taken to a subsequent webpage where s/he may select or insert another party and make a request to grant a right to the other party. Such subsequent webpage is shown in FIG. 1C, discussed below.

Screenshot 100B also shows a field labeled "Add another location" 115, circled. This field permits a user to add an additional work location. In the medical context, such a work location may be, e.g., a doctor's office, clinic, hospital, etc. These "work locations" may be used with so-called "rules" that a user may create or select and use, e.g., to share rights on a group basis or category basis. For example, Dr. Lee may create or select a rule that all PAs affiliated with any of his work locations be granted by him the right to make and process referrals. Accordingly, by adding a work location to his profile, all the PAs affiliated with that location would automatically be granted this right by the system. As another example, Dr. Lee may create or select a rule that all parties affiliated with a given work location be granted by him the right to make and process referrals. Accordingly, when this work location is listed in his profile, all parties affiliated with it would automatically be granted this right by the system, without Dr. Lee having to grant this right individually to each party affiliated with this work location. As another example, Dr. Lee may create or select a rule that for any work location, the third party computer administrator of the domain of that work location be granted by him the right to create a password for that domain. Accordingly, when any work location is added to Dr. Lee's profile, the third party computer administrator associated with that work location would automatically be granted this right by the system. It is apparent that such rules may provide convenience for the user, by automating the process of granting rights, in cases where groups or categories of parties are to be granted the same right(s) by a user. The system may be designed so as to make available to users pre-defined rules and/or to allow users to create their own rules. The system may require that user-created rules follow certain pre-defined formats or logical structures.

As mentioned, clicking on the "Invite Colleague" link 105 (FIG. 1A) or the "Add new connection" link 111 (FIG. 1B) takes the user to the screen illustrated by screenshot 100C in FIG. 1C, to complete the operation of making a request to grant a right. At the screen shown in FIG. 1C, the user Dr. Lee may search for the user(s) to whom s/he wishes to grant a right, by using the search feature 116, circled. For example, Dr. Lee may enter the name or a portion of the name in the field shown in the search feature 116 and click on the search button (magnifying glass icon) shown at the right end of the field, which causes the system to search for users with this name/name portion and return a list of hits (names found that match the search query inputted). In the illustrated example, the system has returned a single hit, namely, PA John Smith, with his work affiliation and email address (of course, other information associated with the user may be shown). Dr. Lee may select any of the returned hits by checking the checkbox 118, circled. Dr. Lee may make a request to grant a right to the selected user(s) by clicking the button labeled "Grant it" 124, circled. In the event, Dr. Lee changes his mind and decides not to make the request to grant a right, he may exit by clicking the link 122, which will return him to the previous page.

As shown at the top of the screen in FIG. 1C, the right being granted is the right to "create and process referrals." This follows from the above explanation of FIGS. 1A and 1B. That is, FIG. 1A pertains solely to the right of making and processing referrals, and FIG. 1B assumes that this is the sole right the system deals with. As explained above, however, additional configurations not illustrated in FIGS. 1A-1E are possible, e.g., in which the screen shown in FIG. 1A pertains to a different right; in which the screen of FIG. 1A shows all rights/actions; in which, in contrast to the assumption of FIG. 1B, the system deals with additional rights; etc. It will be understood that the screen shown in FIG. 1C may be employed with such additional configurations, and may be adapted to work with such additional configurations, as appropriate per the particular configuration (e.g., where the screen shown in FIG. 1A pertains to a different right, the screen shown in FIG. 1C would pertain to that different right; where the screen of FIG. 1A shows all rights/actions, the screen of FIG. 1C would be revised accordingly; etc.). Such adaptations may be along the lines of such configurations as explained above, or otherwise. For example, FIG. 1C could be modified to present a list of rights, actions, or right/action pairs to be selected for granting to particular parties, or a list of authorized connections to be selected for granting particular rights to. See the discussion of the (non-illustrated) "Select Action/Right" button at the end of the discussion of FIG. 1A.

With further reference to FIG. 1C, the system may be designed so that the search feature 116 searches only users who are registered with or otherwise known to the system. If Dr. Lee wishes to grant a right to a party not registered with or known to the system, he may use link 120, circled, to make a request to grant a right to such party. For example, the system may require Dr. Lee to enter the name and email address of such party and then click the "Grant it" button 124 in order to make a request to grant a right to such party.

As mentioned, a user may share a right with more than one party, and more than one users may share a right with a given party. Accordingly, multiple users may also share rights with multiple parties, and they may use rules to select the recipient parties, as described above. The system may also permit such rules to be created/selected and used to identify and select groups of granting parties. The system may also permit such rules to be used to form groups of recipient or granting parties on bases other than by work location. For example, users may be permitted to simply freely create their own groups of recipient parties and granting parties.

As described elsewhere herein, sharing a right may involve a number of requests, replies, notifications, accepting of inputs, and the like. While these operations are not necessarily all explicitly illustrated in or described with reference to screenshots 100A-100E, they are also illustrated in and described with reference to FIGS. 2A and 2B and described above in the general description given prior to the description of the figures.

Figure 1D:
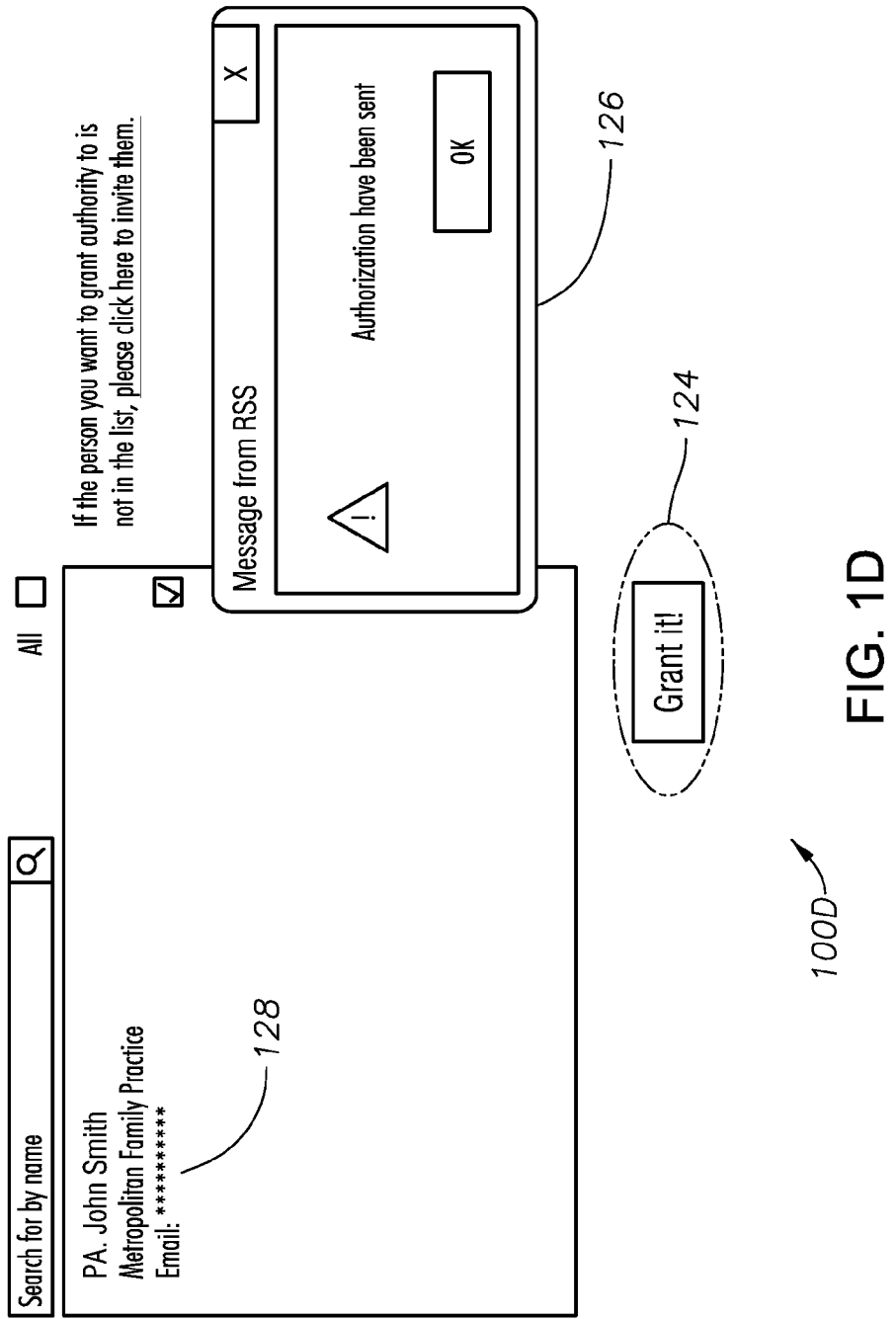

FIG. 1D shows screenshot 100D, which shows a portion of the same screen shown in screenshot 100C of FIG. 1C. Screenshot 100D is a shot taken at a time after Dr. Lee has selected the party 128 (John Smith) to whom he wishes to grant a right and has clicked the "Grant it" button 124 so as to make the request to grant the right to that party. Accordingly, screenshot 100D shows a confirmation message 126 confirming to Dr. Lee that the request to grant the right has been sent to John Smith.

Figure 1E:
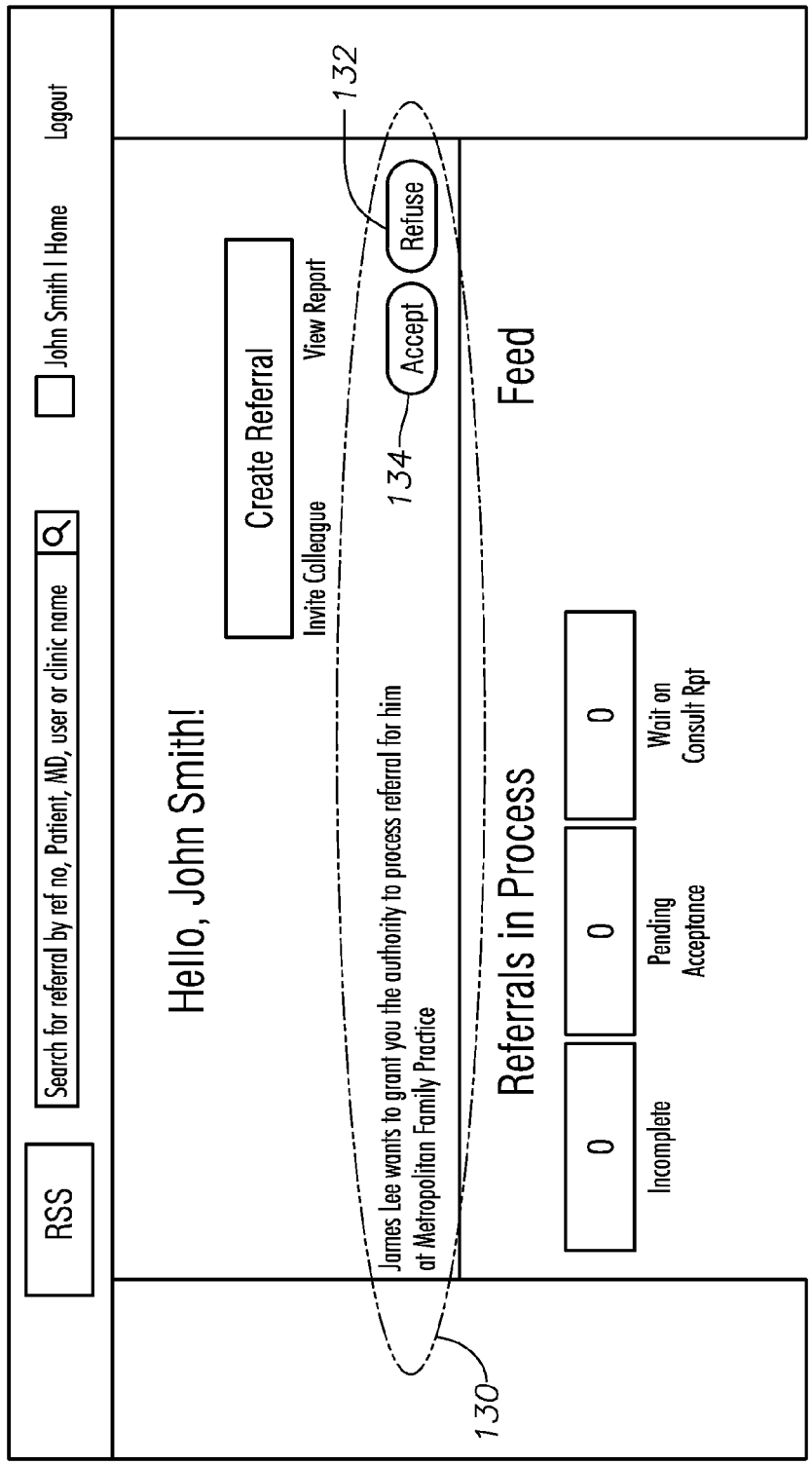

FIG. 1E shows a screenshot 100E, of a home page of John Smith (analogous to the home page of Dr. Lee shown in screenshot 100A in FIG. 1A), which John Smith sees on his GUI when he logs in to the system. Each user may log in to the system from his/her own client device. Multiple users may also log in to the system from a single client device. Because John Smith has been sent a request to grant a right, when he logs in to his home page he sees a notification 130, circled, of the request. The notification 130 indicates the granting user (James Lee) and the right to be granted (the right to process referrals). The notification 130 may also indicate specification/components (e.g., objects) of the right, e.g., that the right to process referrals covers patients affiliated with Metropolitan Family Practice ("Metropolitan Family Practice" being the name of a work location, hence the right covers patients affiliated with this particular work location). Screenshot 100E also shows an Accept button 134 and a Refuse button 132. John Smith can accept or refuse Dr. Lee's request to grant him the indicated right by clicking on the applicable one of these buttons. When John Smith clicks on one of these buttons, the system will grant the right to him or not, in accordance with which button he clicked, and the system may send a notification to Dr. Lee indicating that John Smith accepted or refused the request, as the case may be, and/or, equivalently, that the right has been granted, or has not been granted, to John Smith, accordingly. This notification sent to Dr. Lee may then appear in Dr. Lee's news feed 108 (FIG. 1A).

While the screenshots 100A-100E shown in FIGS. 1A-1E and the accompanying description thereof indicate specific exemplary ways in which a rights sharing system and method may be implemented, it will be understood that innumerable variations in this regard are possible. Such variations may be, for example, in the layout, format or information content of webpages, screen elements or displayed content, in the manner in which specific operations are performed, or how specific functionalities are implemented, etc. Functionalities shown as contained within a single webpage may be implemented using multiple webpages, and functionalities using multiple webpages may be implemented using a single webpage. The design, construction and use of myriad arrangements of such implementation details will be readily understood by one of ordinary skill in the art, and the instant invention is not to be taken as being limited in this regard.

It is also noted that while screenshots are not shown for certain other processes described herein, e.g., authentication, authorization, and the like, one of ordinary skill in the art will readily understand how to implement all such processes not illustrated in FIGS. 1A-1E.

It will also be understood that the description herein with reference to FIGS. 1A-1E includes different ways (some illustrated, some not illustrated) in which a rights sharing system may be designed in order to (permit users to) accomplish the same or similar actions and functions, e.g., with respect to manipulating rights (e.g., selecting rights, granting rights, revoking rights, etc.). Accordingly, it will be understood that a rights sharing system may be designed so as to operate in only some of these redundant ways. To be sure, a system may also be designed to have redundancy. Accordingly, it is not necessary that the entire content of all of screenshots 100A-100E, with their attendant modes of operation, whether illustrated herein or merely described herein as possible variants of the examples actually illustrated in FIGS. 1A-1E, be incorporated in a given implementation of a rights sharing system. Rather, different implementations of such systems may incorporate selected aspects of these screenshots/this description. It is also understood, as noted above, that the content of FIGS. 1A-1E covers only selected portions (e.g., selected operations) of the entire instant disclosure and is not intended to be comprehensive in this regard.

While FIGS. 1A-1E illustrate an example of sharing a specific right in a specific context, embodiments described herein are applicable, and in particular the screens shown in FIGS. 1A-1E are adaptable, to other contexts, and the system may deal with other rights. Examples of such other rights in other contexts include: a supervisor may share the right to write checks in the name of the company up to a certain dollar amount with one of his/her employees; a committee may share the right to approve products for manufacture or to set prices for products with another committee; etc. The sharing of rights can be one user to another user, one-to-many, many-to-one, or many-to-many in various embodiments. It is also possible to implement a rights sharing system omitting functionalities described herein if desired, e.g., the ability to revoke a right could be omitted.

The operations described with reference to FIGS. 1A-1E may be understood as examples of steps or portions of the methods 200 and 201 shown in FIGS. 2A and 2B, discussed below.

Figure 2A:
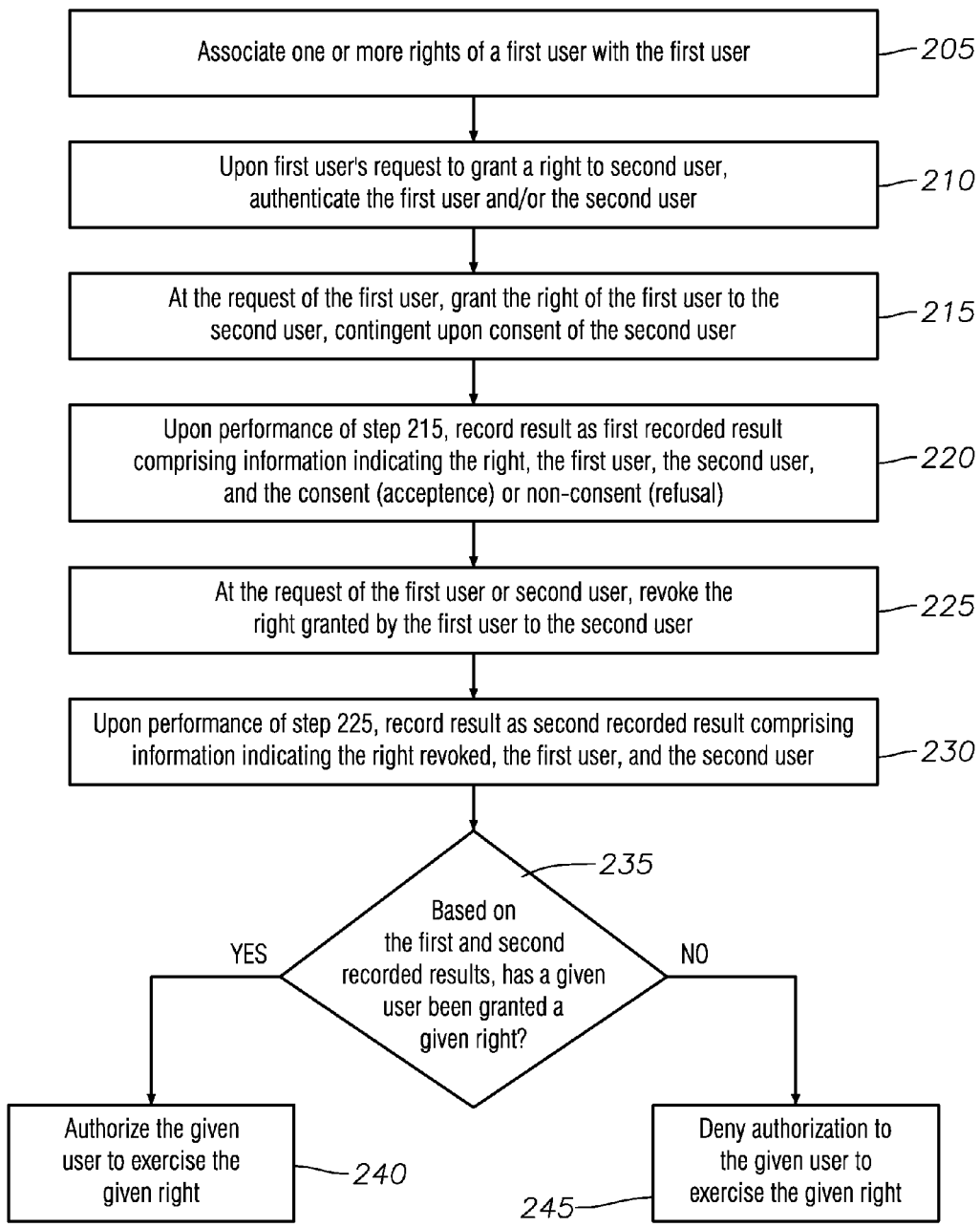
FIGS. 2A and 2B illustrate methods for sharing rights in accordance with at least some embodiments.

FIG. 2A illustrates a method 200 of sharing rights. The method may be performed, e.g., by a server in communication with one or more client devices (discussed in greater detail with reference to FIG. 4D, below). The server may include one or more processors and a memory having instructions for executing the method. For convenience, the method may be described herein with reference to such server, client, etc., but it will be understood that the method need not be performed by these elements.

At step 205, the server associates one or more rights of a first user with the first user. Of course, this association may be contingent upon a determination or confirmation that the first user satisfies the respective criteria required for possessing the rights in question.

At step 210, upon the first user's request to grant a right (belonging to the first user) to a second user, the server authenticates the first user and/or the second user. The authentication may include, e.g., verifying the identity of the respective user and/or verifying the credentials of the respective user. With regard to step 210, the server may have received the request (to grant the right) from a client device that transmitted the request to the server at the instruction of the first user. Of course, acceptance or processing of the request by the server may be contingent upon a determination or confirmation that the second user satisfies the criteria required for possessing the right. If the second user is found not to satisfy the criteria, the server may notify the first user that it rejects the request. (In this case, the first user may notify the second user of the rejection, and the second user may be permitted to update his credentials in an attempt to satisfy the criteria.)

At step 215, at the request of the first user, the server grants the right of the first user to the second user, contingent upon the consent of the second user. The contingency here is this: if the second user consents to (i.e., accepts) the request to grant the right, the right is granted, and if the second user does not consent to (i.e., declines, refuses) the request to grant the right, the right is not granted.

Figure 2B:
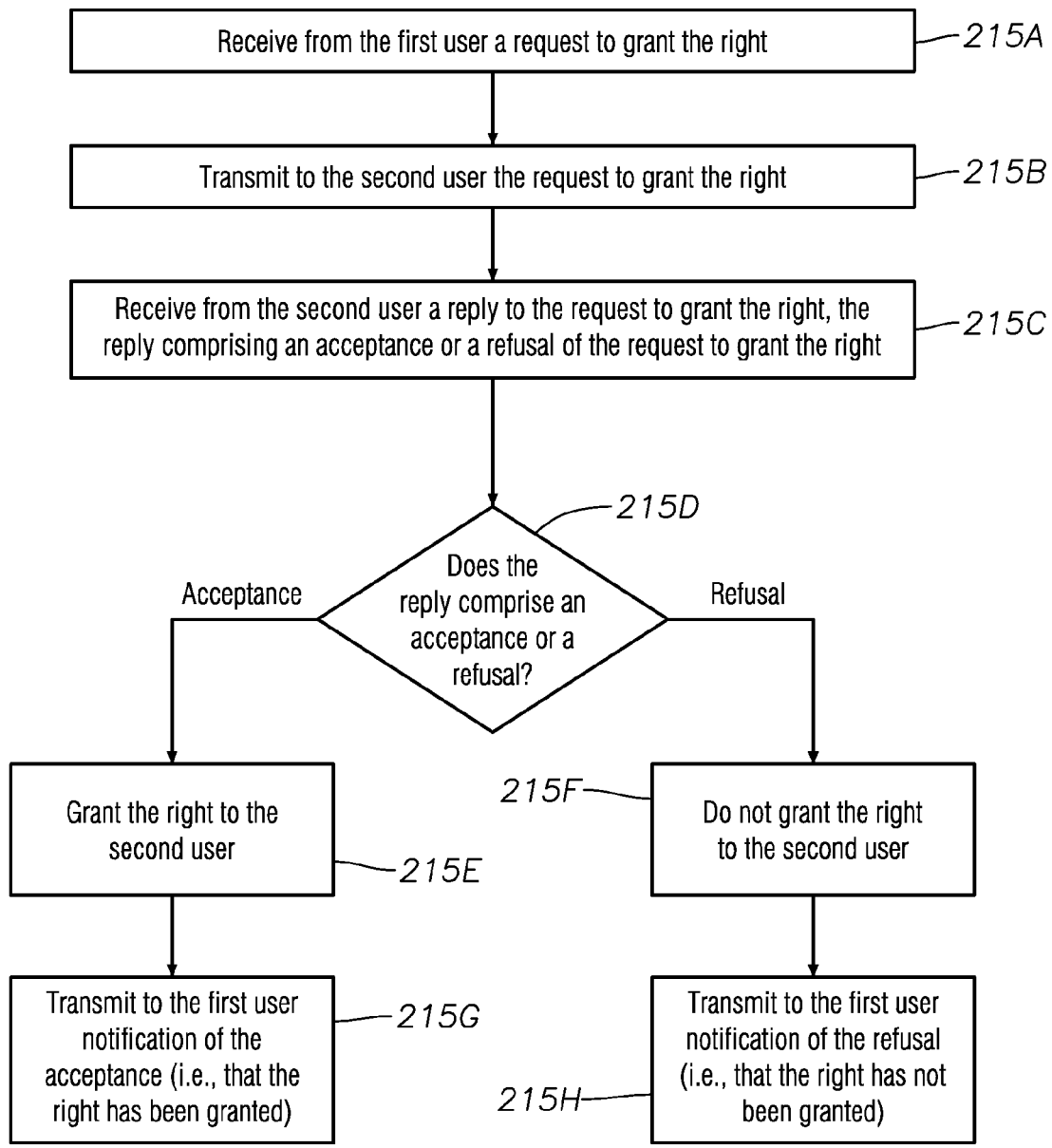

Turning to FIG. 2B, method 201 includes a series of substeps 215A-215H. Step 215 of method 200 may be performed as this series of substeps 215A-215H of method 201.

At step 215A, the server receives from the first user a request to grant, to a second user, a right belonging to the first user. The server may receive this request, via a communication network, from a client device that transmitted the request at the instruction of the first user. At step 215B, the server transmits to the second user the request to grant the right. The server may transmit this request, via a communication network, to a client device associated with the second user. At step 215C, the server receives from the second user a reply to the request to grant the right, the reply indicating acceptance or refusal, by the second user, of the request to grant the right. The server may receive this reply, via a communication network, from a client device that transmitted the reply at the instruction of the second user. At step 215D, represented as a decision box, the server determines whether the reply constitutes an acceptance or a refusal. If the server determines that the reply is an acceptance, then the flow proceeds to step 215E, at which step the server grants the right to the second user. If the server determines that the reply is a refusal, then the flow proceeds to step 215F, at which step the server does not grant the right to the second user. Following step 215E, at step 215G, the server transmits to the first user notification of the reply, indicating that the second user accepted the request to grant the right, and/or, equivalently, notification that the right has been granted. Following step 215F, at step 215H, the server transmits to the first user notification of the reply, indicating that the second user refused the request to grant the right, and/or, equivalently, notification that the right has not been granted. With regard to steps 215G and 215H, the server may transmit these notifications, via a communication network, to a client device associated with the first user. Of course, following step 215E/215F, the server may also confirm to the second user that the right has/has not been granted.

Returning to FIG. 2A, at step 220, upon performance of step 215, the server records the result of step 215 as a first recorded result including information indicating the right, the first user, the second user, and the consent (acceptance) or non-consent (refusal) of the second user. It will be understood that the recording of information indicating the consent or non-consent of the second user is equivalent to, and hence tantamount to, the recording of information indicating the grant or non-grant of the right.

At step 225, at the request of the first user or the second user, the server revokes a right granted by the first user to the second user. Of course, it will be understood that step 225 need not occur at all and in the case of many granted rights will likely not occur.

At step 230, upon performance of step 225, the server records the result of step 225 as a second recorded result including information indicating the right revoked, the first user, and the second user. The second recorded result may also include information indicating the revoking user.

At step 235, represented as a decision box, the server determines, based on the first and second recorded results, whether a given user has been granted a given right. If the server determines that the given user has been granted the given right, then the flow proceeds to step 240, at which step the server authorizes the given user to exercise the given right. If the server determines that the given user has not been granted the given right, then the flow proceeds to step 245, at which step the server denies authorization to the given user to exercise the given right. Steps 235-245 may be performed in at least two distinct situations. One such situation is when a user seeks authorization from the system to exercise a right. The system may be designed to thus control users' exercise of rights so as to permit users to exercise only those rights which they have been granted. Another such situation is when a third party (e.g., a hospital or other medical institution) submits a query to the system, seeking to ascertain whether a user (e.g., a doctor or other medical worker) who wishes to exercise a right is in fact authorized to exercise the right, that is, whether the user has in fact been granted the right. Upon ascertaining whether the user is so authorized, the system may transmit to the third party a reply to its query.

Figure 3:
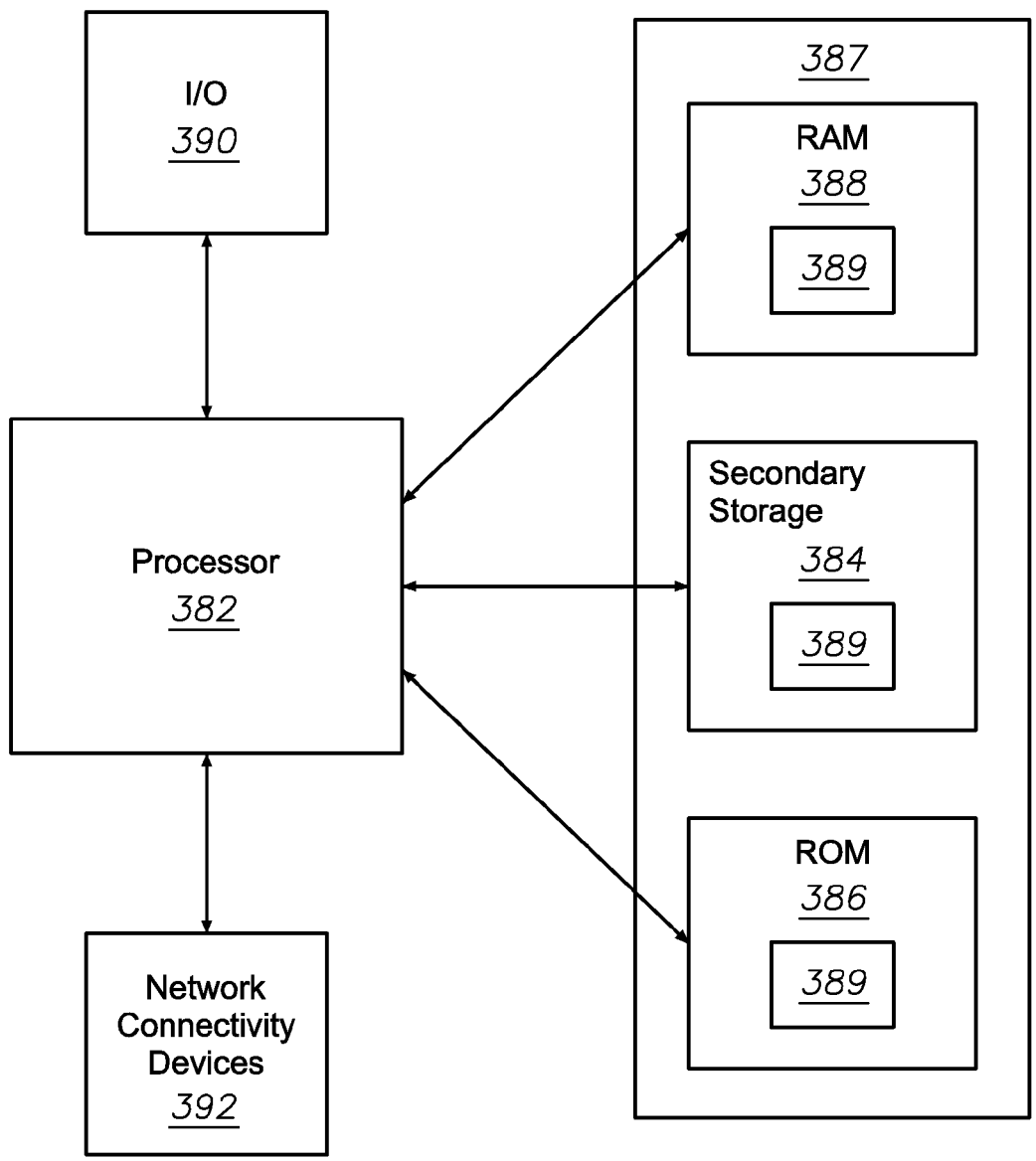
FIG. 3 illustrates a computer system, or a portion thereof, for implementing systems, methods, apparatuses, and articles of manufacture, or portions thereof, in accordance with at least some embodiments.

The rights sharing systems, methods and articles of manufacture described herein may be implemented on one or more particular machines with sufficient processing power, memory resources, and network throughput capability to handle the necessary workload placed upon them. FIGS. 3 and 4A-4E illustrate particular machines suitable for implementing a rights sharing system or part of such a system, according to one or more embodiments disclosed herein. In that regard, FIG. 3 illustrates a particular machine 380, according to at least one embodiment. The particular machine 380 includes at least one processor 382 (which may be referred to as a central processing unit or CPU) that is in communication with a non-transitory machine-readable medium 387, which may be a non-transitory computer-readable medium and/or storage device. The machine-readable medium 387 may comprise memory devices including secondary storage 384, read only memory (ROM) 386, and random access memory (RAM) 388. The processor 382 is further in communication with input/output (I/O) devices 390 and network connectivity devices 392. The processor 382 may be implemented as one or more CPU chips.

The secondary storage 384 may be comprised of one or more disk drives and is used for non-volatile storage of data and may be used as an over-flow data storage device if RAM 388 is not large enough to hold all working data. Secondary storage 384 may be used to store instructions or programs 389 that are loaded into RAM 388 when such instructions or programs 389 are selected for execution and that cause the processor 382 to perform any of the steps described in this disclosure. ROM 386 may also be used to store instructions or programs 389 and may be used to store data for reading during program execution. ROM 386 is a non-volatile memory device which typically has a small memory capacity relative to the larger memory capacity of secondary storage 384. RAM 388 is used to store volatile data and may also be used to store programs or instructions 389. Access to both ROM 386 and RAM 388 is typically faster than to secondary storage 384.

I/O devices 390 may include printers, monitors, touch screens, keyboards, keypads, switches, dials, mice, voice recognizers, card readers, tape readers, or other input devices. The network connectivity devices 392 may include modems, modem banks, ethernet cards, universal serial bus (USB) cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other network devices. These network connectivity devices 392 may enable the processor 382 to communicate with the Internet or one or more intranets. With such a network connection, the processor 382 may receive information from the network, or may output information to the network, in the course of performing the above-described method steps.

The processor 382 executes codes, computer programs, and/or scripts which it accesses from hard disk, floppy disk, optical disc (these various disk based systems may all be considered secondary storage 384), ROM 386, RAM 388, or the network connectivity devices 392.

Figure 4A:
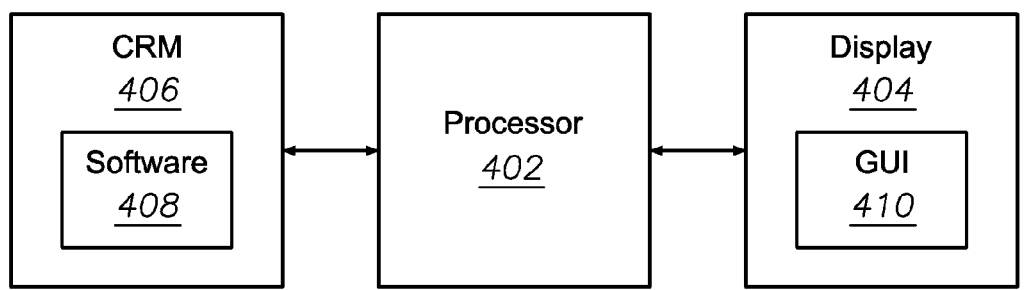
FIGS. 4A-4E illustrate further computer systems, or portions thereof, for implementing systems, methods, apparatuses, and articles of manufacture, or portions thereof, in accordance with at least some embodiments.

According to at least one embodiment, FIG. 4A illustrates a system 400A comprising a non-transitory machine-readable medium or computer-readable medium 406, one or more processors 402, and a display 404. Non-transitory machine-readable medium or computer-readable medium 406 stores software 408 that, when executed by the one or more processors 402, causes the one or more processors 402 to perform or initiate any of the steps described in this disclosure. The system 400A also comprises a graphical user interface ("GUI") 410 displayed on display 404. Preferably, the GUI 410 is the latest version of Internet Explorer ("IE") or any other browser, and the GUI 410 is the point of access between the user and the system 400A.

Figure 4B:
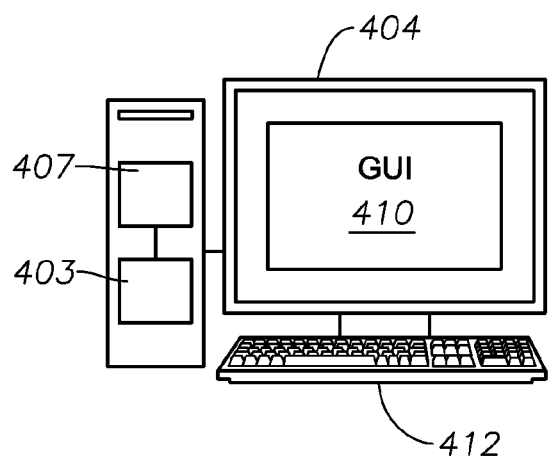
Figure 4C:
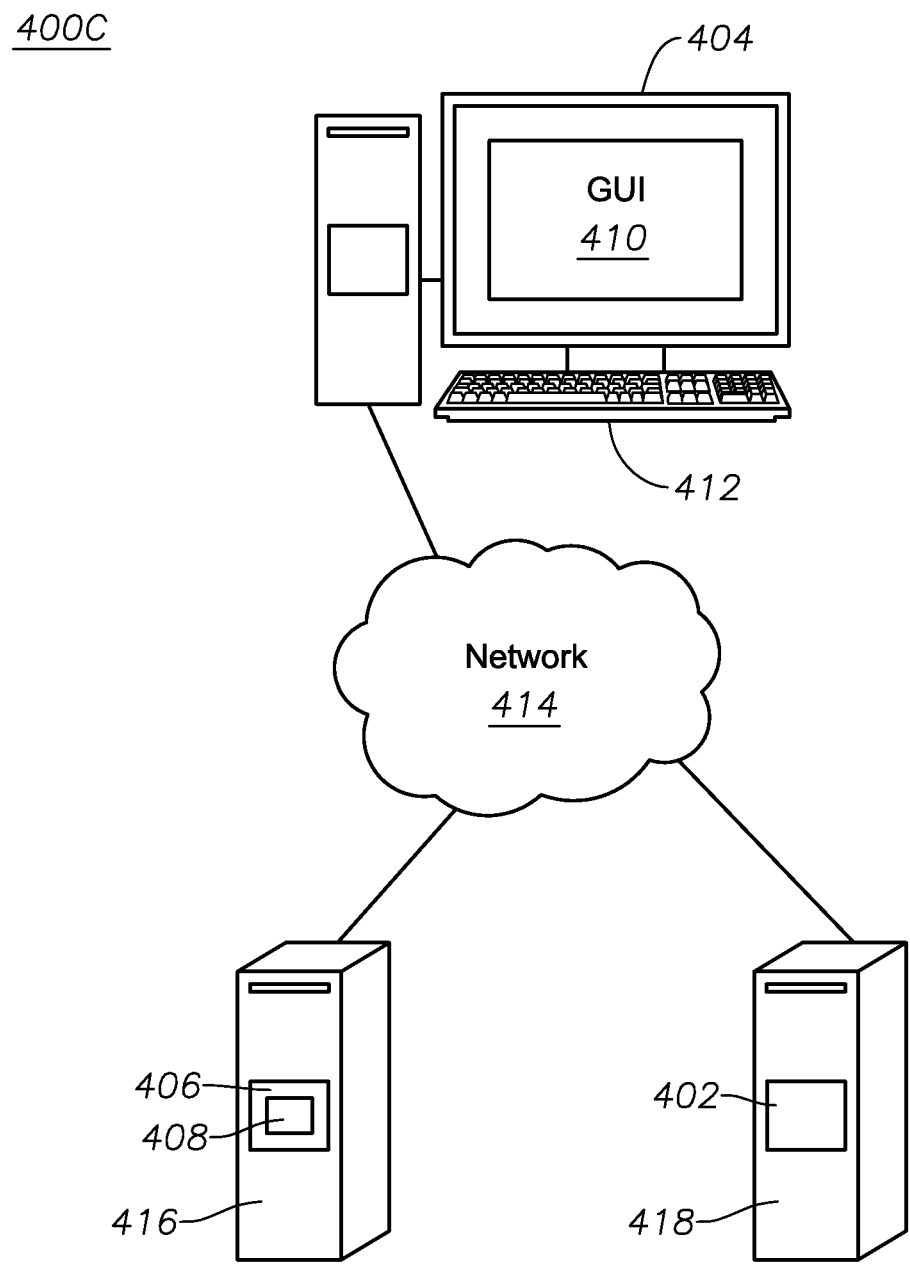

According to at least one embodiment, FIG. 4B illustrates a system 400B, in which a processor 403 is a computer processor, and a computer-readable medium 407 is coupled to the processor 403 in a computer. Display 404 is a computer monitor, and a user can manipulate GUI 410 displayed on display 404 via keyboard 412 and a pointing device or computer mouse (not shown) or other input device. In this embodiment, the processor 403 and computer-readable medium 407 are local. Turning to FIG. 4C, according to at least one embodiment, components of a system 400C are distributed over a network 414. Specifically, the user interacts with GUI 410 displayed on display 404 of a computer, and transmits information over the network 414 for processing by servers 416, 418. Preferably, the network 414 is the Internet. Server 418 comprises a processor 402 that executes software 408 located on a computer-readable medium 406 of server 416. Many configurations and combinations of distributed computing are possible.

Figure 4D:
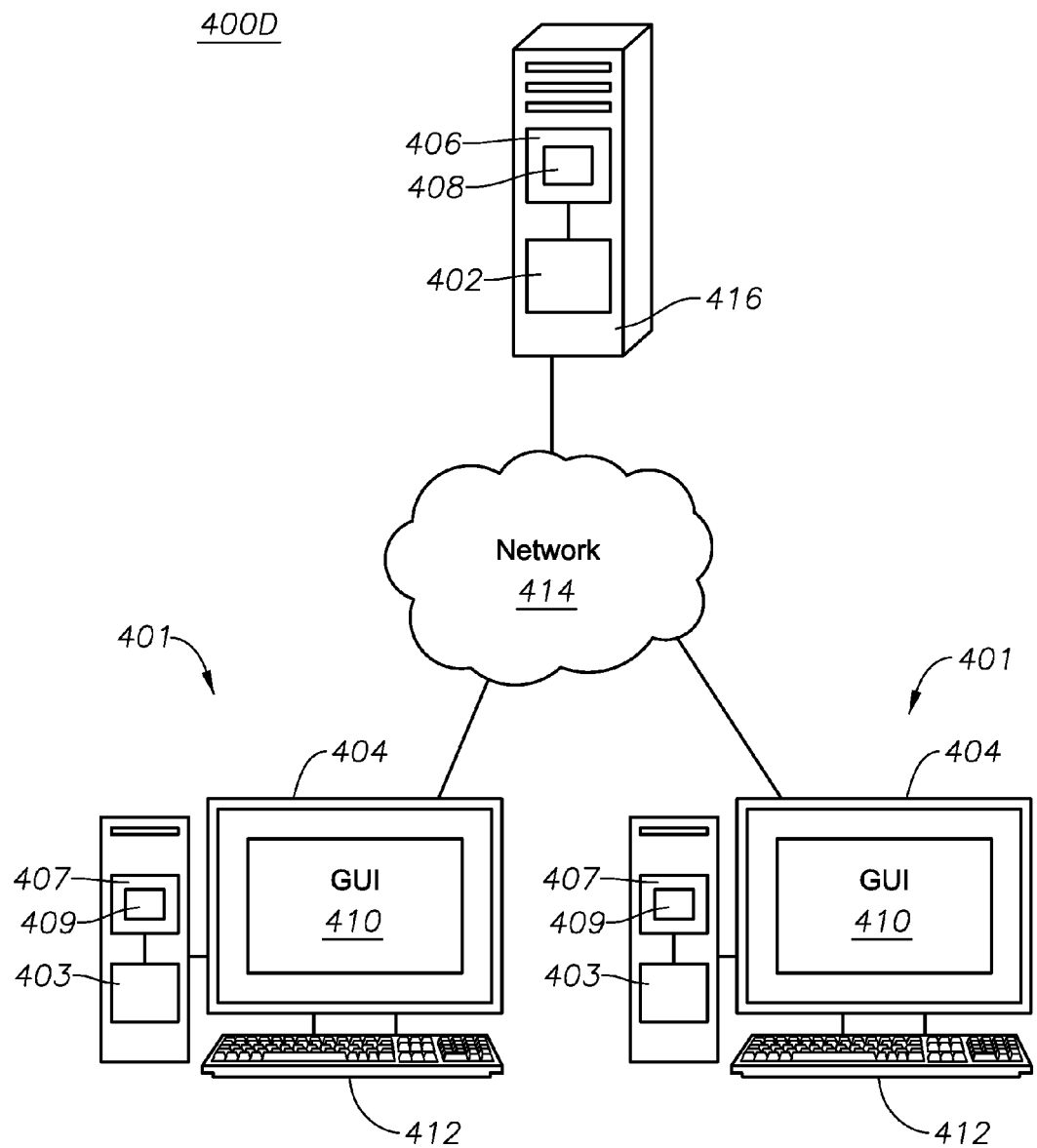

According to at least one embodiment, in another arrangement of distributed computing, FIG. 4D illustrates a system 400D, including a server 416, client devices 401, 401, and a communication network 414. Server 416 may include one or more processors 402, and machine-readable medium 406. Machine-readable medium 406 may be a computer-readable medium. Machine-readable medium 406 may include memory devices (not shown in FIG. 4D) such as described above with respect to machine-readable medium 387 illustrated in FIG. 3. Machine-readable medium 406 may include software 408. While two client devices 401, 401 are illustrated, system 400D may include more than two client devices 401, 401. Each client device 401 may include a processor 403 and a machine-readable medium 407. Machine-readable medium 407 may be a computer-readable medium. Machine-readable medium 407 may include memory devices (not shown in FIG. 4D) such as described above with respect to machine-readable medium 387 illustrated in FIG. 3. Machine-readable medium 407 may include software 409. Each client device may include keyboard 412 and GUI 410 displayed on display 404 and/or other input/output devices (not shown in FIG. 4D). Rights sharing systems, methods, apparatuses, and articles of manufacture described herein may be implemented using system 400D.

Figure 4E:
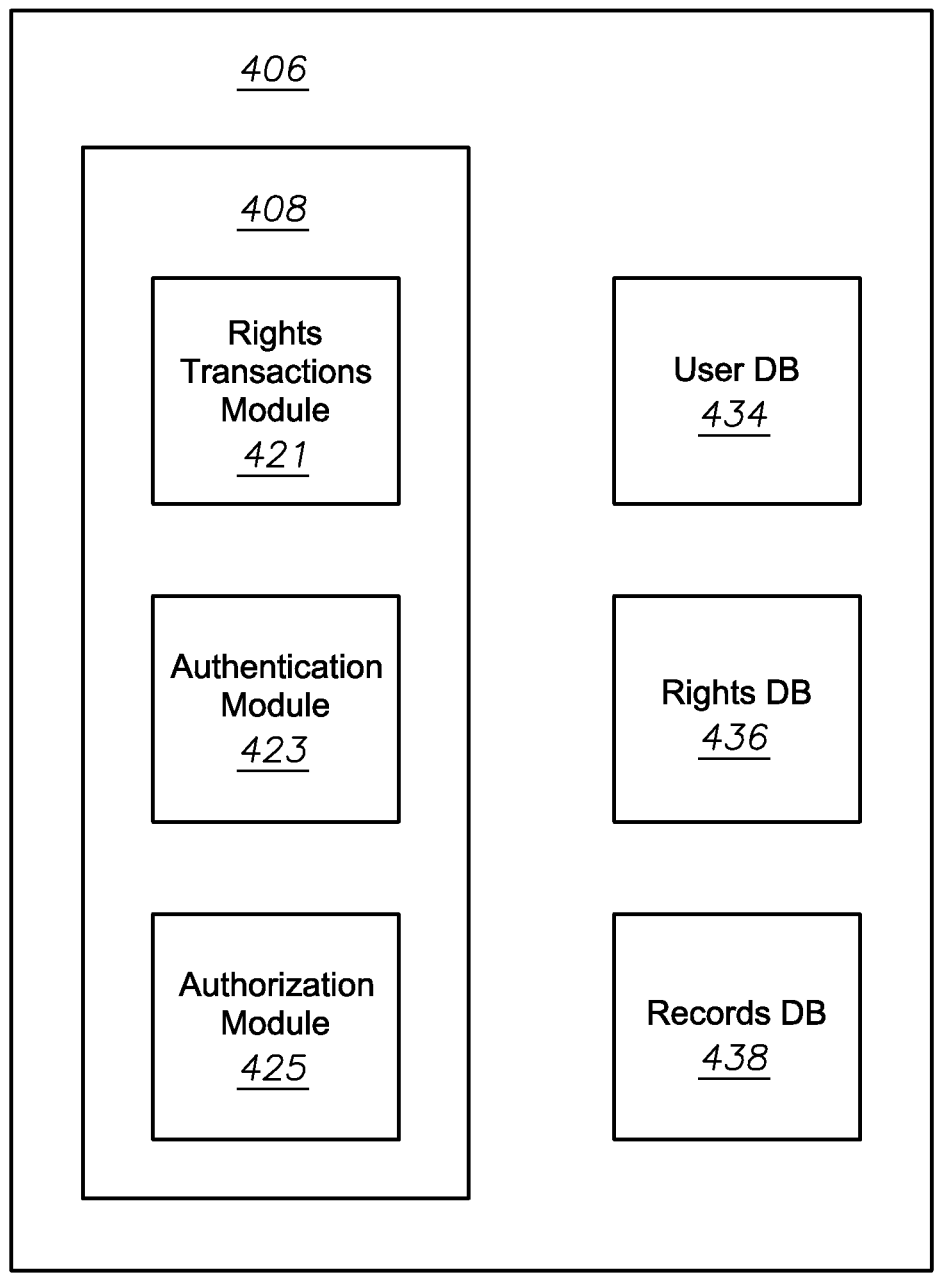

FIG. 4E illustrates applications and databases for performing the functions and operations described herein, which applications and databases may reside in the memory devices (not shown in FIG. 4E) in machine readable medium 406 of server 416 (shown in FIG. 4D). Such applications (which may be included in software 408) may include modules for performing these functions and operations, such as, e.g., a rights transactions module 421 (for implementing and recording the sharing/granting and unsharing/revoking of rights), an authentication module 423 (for authenticating users), and an authorization module 425 (for authorizing/denying authorization to a user to exercise a right, and for receiving and responding to queries regarding the same). Such databases, which may be called upon by such applications in performing these functions and operations, may include, e.g., a user database 434 containing user data, a rights database 436 containing rights data, and a records database 438 containing records of transactions and other processes. User data may include, e.g., for each user, data pertaining to the user's identification, the user's credentials, the criteria possessed by the user (i.e., criteria the satisfaction of which is required to possess particular rights), the rights associated with (hence grantable by) the user, the rights granted to (hence exercisable by) the user, etc. Rights data may include, e.g., for each right in the system, data pertaining to criteria required to possess the right, components/specification of the right, users associated with (hence permitted to grant) the right, users granted (hence permitted to exercise) the right, etc. Records of transactions and other processes may include data pertaining to grants of rights, revocations of rights, results of authentication processes, results of authorization processes, etc. Data other than that described above, as well as data organized in manners other than that described above, may also be recorded and stored in appropriate databases. For example, collective data may be recorded (or generated from data of individual events) and stored, further to data organized on a per user, per right, or per transaction basis. Of course, the individuation or demarcation of databases and modules may be varied from that described.

Returning to FIG. 4D, with system 400D, server 416 may serve those functions and operations described herein as being attributable to the rights sharing system. Each client device 401 may serve those functions and operations described herein as being attributable to one or more users (individuals, parties, etc.). In this arrangement, each user or client device 401 (e.g., where each user is associated with a respective client device 401) may be deemed a node of the system, and server 416 may be deemed the center of the system. Transactions (sharing/granting or unsharing/revoking of rights) are interactions between two or more nodes/users/client devices 401, but all transactions may go through the center/system/server 416, which may implement and record every transaction. Certain other processes may occur between a node/user/client device 401 and the center/system/server 416, for example, the process of authenticating a user, and the process of authorizing/denying authorization to a user to exercise a right. In the arrangement of FIG. 4D, users can use cloud computing to access and make use of the system 400D (to perform transactions and other processes), as from the user's point of view the center or system effectively resides in the cloud.

Embodiments of the present invention may be implemented in the form of software, hardware, firmware, application logic or a combination of any of these. The software, firmware, application logic and/or hardware may reside on integrated circuit chips, modules or memories. If desired, part of the software, hardware, firmware, and/or application logic may reside on integrated circuit chips, part of the software, hardware, firmware, and/or application logic may reside on modules, and part of the software, hardware, firmware, and/or application logic may reside on memories. In at least one embodiment, the application logic, software or an instruction set is maintained on any one of various conventional non-transitory computer-readable media.

Processes and logic flows which are described in this specification can be performed by one or more programmable processors executing one or more computer programs to perform functions by operating on input data and generating output. Processes and logic flows can also be performed by special purpose logic circuitry, e.g., an FPGA (field programmable gate array) or an ASIC (application-specific integrated circuit). Apparatus or devices can also include, in addition to hardware, code that creates an execution environment for computer program, e.g., code that constitutes processor firmware, a protocol stack, a database management system, an operating system, a cross-platform runtime environment, e.g., a virtual machine, or a combination of one or more of them.

A computer-readable medium as described in this specification may be any media or means that can contain, store, communicate, propagate or transport the instructions for use by or in connection with an instruction execution system, apparatus, or device. A computer-readable medium may comprise a computer-readable storage medium that may be any media or means that can contain or store the instructions for use by or in connection with an instruction execution system, apparatus, or device, such as a computer. Computer-readable media may include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Embodiments and/or features as described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with the rights sharing system as described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

As noted, the computing system can include clients and servers. A client and server are generally remote from each other and typically interact through a communication network. The relationship of client and server arises by virtue of computer programs running on the respective computers and having a client-server relationship to each other.

While the instant description may in places refer to a rights sharing "system" (or simply the "system"), it will be understood that such description applies also, mutatis mutandis, to a corresponding rights sharing method, and vice versa.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. While this disclosure contains many specific implementation details, these specific implementation details are not meant to be construed as limitations on the scope of the invention or of what may be claimed, but rather as descriptions of features specific to particular embodiments of the invention.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of a single embodiment or of different embodiments are combinable with one another, unless indicated otherwise.

Moreover, although features may be described as acting in certain combinations and even initially claimed as such, one or more features from a combination as described or a claimed combination can in certain cases be excluded from the combination, and the claimed combination may be directed to a subcombination or variation of a subcombination. Although various aspects of the invention are set out in the independent claims, other aspects of the invention comprise other combinations of features from the embodiments and/or from the dependent claims with the features of the independent claims, and not solely the combinations explicitly set out in the claims.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method performed by a server in communication with one or more client devices, the method comprising:
   receiving, at the server, from one of the one or more client devices a request by a first user to grant a right of the first user to a second user;
   transmitting, from the server, to one of the one or more client devices the request to grant the right of the first user to the second user;
   receiving, at the server, from one of the one or more client devices a reply by the second user to the request to grant the right of the first user to the second user, the reply comprising an acceptance or a refusal of the request to grant the right of the first user to the second user, wherein:
   if the reply comprises the acceptance:
      by the server, granting the right of the first user to the second user; and
   if the reply comprises the refusal:
      by the server, not granting the right of the first user to the second user; and
   at the request of the first user or the second user, revoking a right granted by the first user to the second user, wherein the right granted by the first user to the second user is revoked regardless of whether the request to revoke is made by the first user or the second user,
   wherein the server comprises one or more processors, and the one or more processors comprise hardware, and
   wherein the right is defined as a function $R=f(A, O, P, C)$, where R is the right, A is one or more actions authorized by the granting of the right O is one or more objects of the one or more actions authorized by the granting of the right, P is one or more parties bound by the granting of the right, and C is one or more conditions imposed upon the granted right.

2. A method according to claim 1, further comprising:
   if the reply comprises the acceptance:
      transmitting to the first user notification of (a) the acceptance and/or (b) the granting of the right; and
   if the reply comprises the refusal:
      transmitting to the first user notification of (a) the refusal and/or (b) the non-granting of the right.

3. A method according to claim 1, further comprising:
   associating the right of the first user with the first user.

4. A method according to claim 1, further comprising:
   authenticating at least one of the first user and the second user,
   wherein the step of authenticating at least one of the first user and the second user comprises verifying at least one of (i) the identity of the respective user and (ii) the credentials of the respective user.

5. A method according to claim 1, further comprising:
  determining whether a given user has been granted a given right;
  if the given user has been granted the given right, authorizing the given user to exercise the given right; and
  if the given user has not been granted the given right, denying authorization to the given user to exercise the given right.

6. A method according to claim 5, further comprising:
  wherein, for any performed instance of the granting of the right of the first user to the second user, a result of the performance thereof is recorded as a first recorded result comprising information indicating the right, the first user and the second user,
  wherein for any performed instance of the revoking of a right granted by the first user to the second user, a result of the performance thereof is recorded as a second recorded result comprising information indicating the right revoked, the first user, and the second user, and
  wherein the determination whether a given user has been granted a given right is made based on the first and second recorded results.

7. A method according to claim 1, further comprising:
  receiving a query from a third party as to whether a given user has been granted a given right;
  determining whether the given user has been granted the given right; and
  transmitting to the third party a reply to the query, the reply indicating whether the given user has been granted the given right.

8. An article of manufacture comprising a non-transitory machine-readable medium comprising instructions that, when executed, enable a server comprising a processor-based system, in communication with one or more client devices, to:
  receive from one of the one or more client devices a request by a first user to grant a right of the first user to a second user;
  transmit to one of the one or more client devices the request to grant the right of the first user to the second user;
  receive from one of the one or more client devices a reply by the second user to the request to grant the right of the first user to the second user, the reply comprising an acceptance or a refusal of the request to grant the right of the first user to the second user, wherein:
    if the reply comprises the acceptance:
      grant the right of the first user to the second user; and
    if the reply comprises the refusal:
      decline granting the right of the first user to the second user; and
  at the request of the first user or the second user, revoke a right granted by the first user to the second user, wherein the right granted by the first user to the second user is revoked regardless of whether the request to revoke is made by the first user or the second user,
  wherein the processor-based system comprises one or more processors, and the one or more processors comprise hardware, and
  wherein the right is defined as a function R=f(A, O, P, C), where R is the right, A is one or more actions authorized by the granting of the right, O is one or more objects of the one or more actions authorized by the granting of the right, P is one or more parties bound by the granting of the right, and C is one or more conditions imposed upon the granted right.

9. An article of manufacture according to claim 8, wherein the instructions, when executed, further enable the server comprising the processor-based system, in communication with the one or more client devices, to:
  if the reply comprises the acceptance:
    transmit to the first user notification of (a) the acceptance and/or (b) the granting of the right; and
  if the reply comprises the refusal:
    transmit to the first user notification of (a) the refusal and/or (b) the non-granting of the right.

10. An article of manufacture according to claim 8, wherein the instructions, when executed, further enable the server comprising the processor-based system, in communication with the one or more client devices, to:
  associate the right of the first user with the first user.

11. An article of manufacture according to claim 8, wherein the instructions, when executed, further enable the server comprising the processor-based system, in communication with the one or more client devices, to:
  authenticate at least one of the first user and the second user,
  wherein the step of authenticating at least one of the first user and the second user comprises verifying at least one of (i) the identity of the respective user and (ii) the credentials of the respective user.

12. An article of manufacture according to claim 8, wherein the instructions, when executed, further enable the server comprising the processor-based system, in communication with the one or more client devices, to:
  determine whether a given user has been granted a given right;
  if the given user has been granted the given right, authorize the given user to exercise the given right; and
  if the given user has not been granted the given right, deny authorization to the given user to exercise the given right.

13. An article of manufacture according to claim 12, wherein the instructions, when executed, further enable the server comprising the processor-based system, in communication with the one or more client devices, to:
  wherein, for any performed instance of the granting of the right of the first user to the second user, a result of the performance thereof is recorded as a first recorded result comprising information indicating the right, the first user and the second user,
  wherein for any performed instance of the revoking of a right granted by the first user to the second user, a result of the performance thereof is recorded as a second recorded result comprising information indicating the right revoked, the first user, and the second user, and
  wherein the determination whether a given user has been granted a given right is made based on the first and second recorded results.

14. An article of manufacture according to claim 8, wherein the instructions, when executed, further enable the server comprising the processor-based system, in communication with the one or more client devices, to:
  receive a query from a third party as to whether a given user has been granted a given right;
  determine whether the given user has been granted the given right; and
  transmit to the third party a reply to the query, the reply indicating whether the given user has been granted the given right.

15. A system comprising:
  a server, the server comprising:
    one or more processors, the one or more processors comprising hardware; and memory coupled to the one or more processors, the memory comprising executable instructions that, when executed, enable the one or more processors, in communication with one or more client devices, to:

receive from one of the one or more client devices a request by a first user to grant a right of the first user to a second user;

transmit to one of the one or more client devices the request to grant the right of the first user to the second user;

receive from one of the one or more client devices a reply by the second user to the request to grant the right of the first user to the second user, the reply comprising an acceptance or a refusal of the request to grant the right of the first user to the second user, wherein:

if the reply comprises the acceptance:
grant the right of the first user to the second user; and if the reply comprises the refusal:
decline granting the right of the first user to the second user; and at the request of the first user or the second user, revoke a right granted by the first user to the second user, wherein the right granted by the first user to the second user is revoked regardless of whether the request to revoke is made by the first user or the second user, wherein the right is defined as a function R=f(A, O, P, C), where R is the right, A is one or more actions authorized by the granting of the right, O is one or more objects of the one or more actions authorized by the granting of the right, P is one or more parties bound by the granting of the right, and C is one or more conditions imposed upon the granted right.

16. A system according to claim 15, wherein the instructions, when executed, further enable the one or more processors, in communication with the one or more client devices, to:

if the reply comprises the acceptance:
transmit to the first user notification of (a) the acceptance and/or (b) the granting of the right; and if the reply comprises the refusal:
transmit to the first user notification of (a) the refusal and/or (b) the non-granting of the right.

17. A system according to claim 15, wherein the instructions, when executed, further enable the one or more processors, in communication with the one or more client devices, to:
associate the right of the first user with the first user.

18. A system according to claim 15, wherein the instructions, when executed, further enable the one or more processors, in communication with the one or more client devices, to:
authenticate at least one of the first user and the second user,
wherein the step of authenticating at least one of the first user and the second user comprises verifying at least one of (i) the identity of the respective user and (ii) the credentials of the respective user.

19. A system according to claim 15, wherein the instructions, when executed, further enable the one or more processors, in communication with the one or more client devices, to:
determine whether a given user has been granted a given right;
if the given user has been granted the given right, authorize the given user to exercise the given right; and
if the given user has not been granted the given right, deny authorization to the given user to exercise the given right.

20. A system according to claim 19, wherein the instructions, when executed, further enable the one or more processors, in communication with the one or more client devices, to:
wherein, for any performed instance of the granting of the right of the first user to the second user, a result of the performance thereof is recorded as a first recorded result comprising information indicating the right, the first user and the second user,
wherein for any performed instance of the revoking of a right granted by the first user to the second user, a result of the performance thereof is recorded as a second recorded result comprising information indicating the right revoked, the first user, and the second user, and
wherein the determination whether a given user has been granted a given right is made based on the first and second recorded results.

21. A system according to claim 15, wherein the instructions, when executed, further enable the one or more processors, in communication with the one or more client devices, to:
receive a query from a third party as to whether a given user has been granted a given right;
determine whether the given user has been granted the given right; and
transmit to the third party a reply to the query, the reply indicating whether the given user has been granted the given right.

* * * * *